US012744036B2

(12) United States Patent
Ma et al.

(10) Patent No.: US 12,744,036 B2
(45) Date of Patent: Sep. 22, 2026

(54) CONTROL METHOD BASED ON VEHICLE EXTERNAL AUDIO SYSTEM, VEHICLE INTELLIGENT MARKETING METHOD, ELECTRONIC APPARATUS, AND STORAGE MEDIUM

(71) Applicant: PATEO CONNECT+ Technology (Shanghai) Corporation, Shanghai (CN)

(72) Inventors: Bin Ma, Shanghai (CN); Guigui Lu, Shanghai (CN)

(73) Assignee: PATEO CONNECT+ Technology (Shanghai) Corporation, Shanghai (CN)

( * ) Notice: Subject to any disclaimer, the term of this patent is extended or adjusted under 35 U.S.C. 154(b) by 91 days.

(21) Appl. No.: 18/516,921

(22) Filed: Nov. 21, 2023

(65) Prior Publication Data

US 2024/0161748 A1 May 16, 2024

Related U.S. Application Data

(63) Continuation of application No. PCT/CN2023/091961, filed on May 4, 2023.

(30) Foreign Application Priority Data

Jun. 8, 2022 (CN) ......................... 202210643266.2
Jun. 8, 2022 (CN) ......................... 202210643860.1

(51) Int. Cl.
*G10L 15/22* (2006.01)
*B60R 25/01* (2013.01)
(Continued)

(52) U.S. Cl.
CPC .............. *G10L 15/22* (2013.01); *B60R 25/01* (2013.01); *G06V 40/176* (2022.01); *G10L 15/005* (2013.01); *G10L 25/63* (2013.01)

(58) Field of Classification Search
CPC ....... G10L 15/22; G10L 15/005; G10L 25/63; G10L 13/033; B60R 25/01; G06V 40/176;
(Continued)

(56) References Cited

U.S. PATENT DOCUMENTS 6,760,706 B1 7/2004 Ambrose et al.
8,781,899 B2 * 7/2014 Edwards ............ G06Q 30/0271 705/14.69
(Continued)

FOREIGN PATENT DOCUMENTS

CN 107743643 A 2/2018
CN 109079813 A 12/2018
(Continued)

OTHER PUBLICATIONS

The World Intellectual Property Organization (WIPO) International Search Report for PCT/CN2023/091961 Jul. 25, 2023 4 Pages.

*Primary Examiner* — Thuykhanh Le
(74) *Attorney, Agent, or Firm* — Anova Law Group, PLLC

(57) ABSTRACT

A control method of a vehicle external audio system includes, in response to the vehicle external audio system establishing a first type voice interaction strategy with a person, obtaining a plurality of biological features of the person performing voice interaction with the vehicle external audio system, determining emotion of the person according to a change of the plurality of biological features, and, in response to the emotion of the person changing, controlling the vehicle external audio system to switch from the first type voice interaction strategy to a second type voice interaction strategy, or, in response to the vehicle external audio system establishing the first type voice interaction strategy with the person, obtaining surrounding environment information of a vehicle, and in response to the surrounding (Continued)

2000

In response to recognizing that the person approaches the vehicle, switch the vehicle external audio system from the standby state to the working state — S2210

Obtain orientation information of the person relative to the vehicle and determine a position where the person is interested in the vehicle according to the orientation information — S2220

Obtain introduction information corresponding to the position where the person is interested in the vehicle based on the marketing strategy and control the vehicle external audio system to issue a sales voice based on the introduction information — S2230

Control the vehicle external audio system to issue a voice asking whether the person enters the vehicle — S2240

In response to receiving the voice of the answer of the person to confirm to enter the vehicle, control the vehicle to be unlocked — S2250

Obtain position information and/or posture information of the person inside the vehicle and obtain introduction information corresponding to the position information and/or posture information of the person inside the vehicle based on the marketing strategy — S2260

Control a vehicle internal audio system to issue a sales voice based on the introduction information — S2270

Control the vehicle internal audio system to issue a voice asking whether the person test drives the vehicle, in response to receiving a voice of a user answer to confirm the test-driving, and detecting driver license information of the person — S2280

In response to determining that the driver license information of the person meets a predetermined requirement, control the power system of the vehicle to start to allow the person to test drive the vehicle — S2290 environment information changing, controlling the vehicle external audio system to switch from the first type voice interaction strategy to the second type voice interaction strategy.

9 Claims, 14 Drawing Sheets

(51) Int. Cl.
*G06V 40/16* (2022.01)
*G10L 15/00* (2013.01)
*G10L 25/63* (2013.01)

(58) Field of Classification Search
CPC ...... G06V 20/56; G06V 40/161; G06N 20/00; G06Q 30/015; G06Q 30/0265; G06Q 30/0268; G06Q 50/265; G06Q 30/0271; G06Q 30/0623; G06Q 50/40; G06F 3/167
USPC .......................................................... 704/275
See application file for complete search history.

(56) References Cited

U.S. PATENT DOCUMENTS

| | | | | |
|---|---|---|---|---|
| 10,096,319 | B1 * | 10/2018 | Jin | G10L 25/66 |
| 10,459,686 | B1 * | 10/2019 | Lenke | G06F 3/165 |
| 10,726,847 | B1 * | 7/2020 | Hardage | G10L 15/063 |
| 10,802,575 | B2 * | 10/2020 | Schlecht | G06F 3/011 |
| 10,867,340 | B1 * | 12/2020 | Gauvin | H04W 4/14 |
| 12,002,305 | B1 * | 6/2024 | Gross | G06Q 40/02 |
| 2010/0198628 | A1 * | 8/2010 | Rayner | G06Q 30/02<br>707/723 |
| 2015/0206181 | A1 * | 7/2015 | Parundekar | G06Q 30/0251<br>705/14.49 |
| 2016/0042401 | A1 * | 2/2016 | Menendez | G06Q 30/0269<br>705/14.43 |
| 2016/0093081 | A1 * | 3/2016 | Kim | G06F 3/167<br>345/156 |
| 2016/0363991 | A1 * | 12/2016 | Schlecht | G06F 3/011 |
| 2016/0379274 | A1 * | 12/2016 | Irwin | G06Q 30/0271<br>705/14.67 |
| 2017/0083757 | A1 * | 3/2017 | Enomoto | G06V 40/176 |
| 2017/0187880 | A1 * | 6/2017 | Raanani | H04M 3/5175 |
| 2018/0105051 | A1 * | 4/2018 | Zheng | G06Q 20/3276 |
| 2018/0136655 | A1 * | 5/2018 | Kim | B60R 25/25 |
| 2019/0102146 | A1 * | 4/2019 | Swift | G06F 3/167 |
| 2019/0228349 | A1 * | 7/2019 | Cornejo Arellano | G06Q 10/02 |
| 2020/0081753 | A1 * | 3/2020 | Deluca | G06F 3/165 |
| 2020/0110840 | A1 * | 4/2020 | Mukherjee | G10L 15/1815 |
| 2020/0134671 | A1 * | 4/2020 | Maccini | H04W 12/30 |
| 2020/0152197 | A1 * | 5/2020 | Penilla | H04L 67/125 |
| 2020/0372547 | A1 * | 11/2020 | Deole | H04L 67/306 |
| 2020/0412744 | A1 * | 12/2020 | Spurlock | G06F 18/214 |
| 2021/0081994 | A1 * | 3/2021 | Newell | G06Q 30/0265 |
| 2021/0150556 | A1 * | 5/2021 | Kimura | G06Q 30/0208 |
| 2021/0201355 | A1 * | 7/2021 | van den Berg | B60W 60/001 |
| 2021/0217058 | A1 * | 7/2021 | Nakaichi | G06Q 30/0266 |
| 2021/0327412 | A1 * | 10/2021 | Podgorny | G06N 20/20 |
| 2021/0390583 | A1 * | 12/2021 | Oh | H04W 4/44 |
| 2021/0402611 | A1 * | 12/2021 | Hiroya | B25J 9/1697 |
| 2022/0116673 | A1 * | 4/2022 | Cho | G06Q 30/0265 |
| 2022/0148034 | A1 * | 5/2022 | Min | G06Q 30/0256 |
| 2022/0324485 | A1 * | 10/2022 | Li | B60W 40/04 |
| 2022/0413797 | A1 * | 12/2022 | Kallara Rajappan | G06F 3/017 |
| 2022/0414725 | A1 * | 12/2022 | Igarashi | G06Q 20/322 |
| 2023/0191992 | A1 * | 6/2023 | Gilbert | B60Q 9/00<br>704/274 |
| 2023/0230504 | A1 * | 7/2023 | Masuda | G09B 21/00<br>434/112 |
| 2023/0306693 | A1 * | 9/2023 | Gerrese | G06V 20/20 |
| 2025/0033615 | A1 * | 1/2025 | Liu | G06V 40/176 |

FOREIGN PATENT DOCUMENTS

| | | | | |
|---|---|---|---|---|
| CN | 110070395 A | 7/2019 | | |
| CN | 111368609 A | 7/2020 | | |
| CN | 111402925 A | 7/2020 | | |
| CN | 111673744 A | 9/2020 | | |
| CN | 113844360 A | 12/2021 | | |
| CN | 114115533 A | 3/2022 | | |
| CN | 114582335 A | 6/2022 | | |
| JP | H0723666 B2 | * | 3/1995 | B60R 16/02 |
| JP | H0723666 U | 5/1995 | | |
| JP | 2003331185 A | 11/2003 | | |
| WO | 2020003449 A1 | 1/2020 | | |

* cited by examiner

Figure 4A:
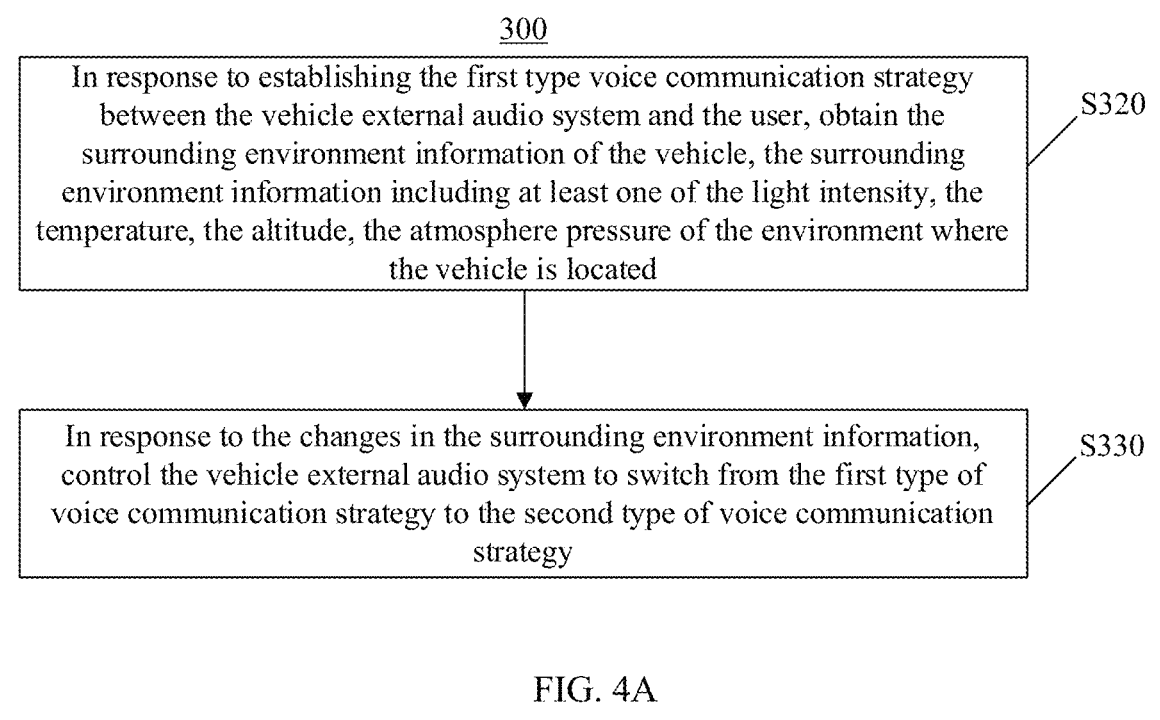

300

In response to establishing the first type voice communication strategy between the vehicle external audio system and the user, obtain the surrounding environment information of the vehicle, the surrounding environment information including at least one of the light intensity, the temperature, the altitude, the atmosphere pressure of the environment where the vehicle is located

S320

In response to the changes in the surrounding environment information, control the vehicle external audio system to switch from the first type of voice communication strategy to the second type of voice communication strategy

Figure 4B:
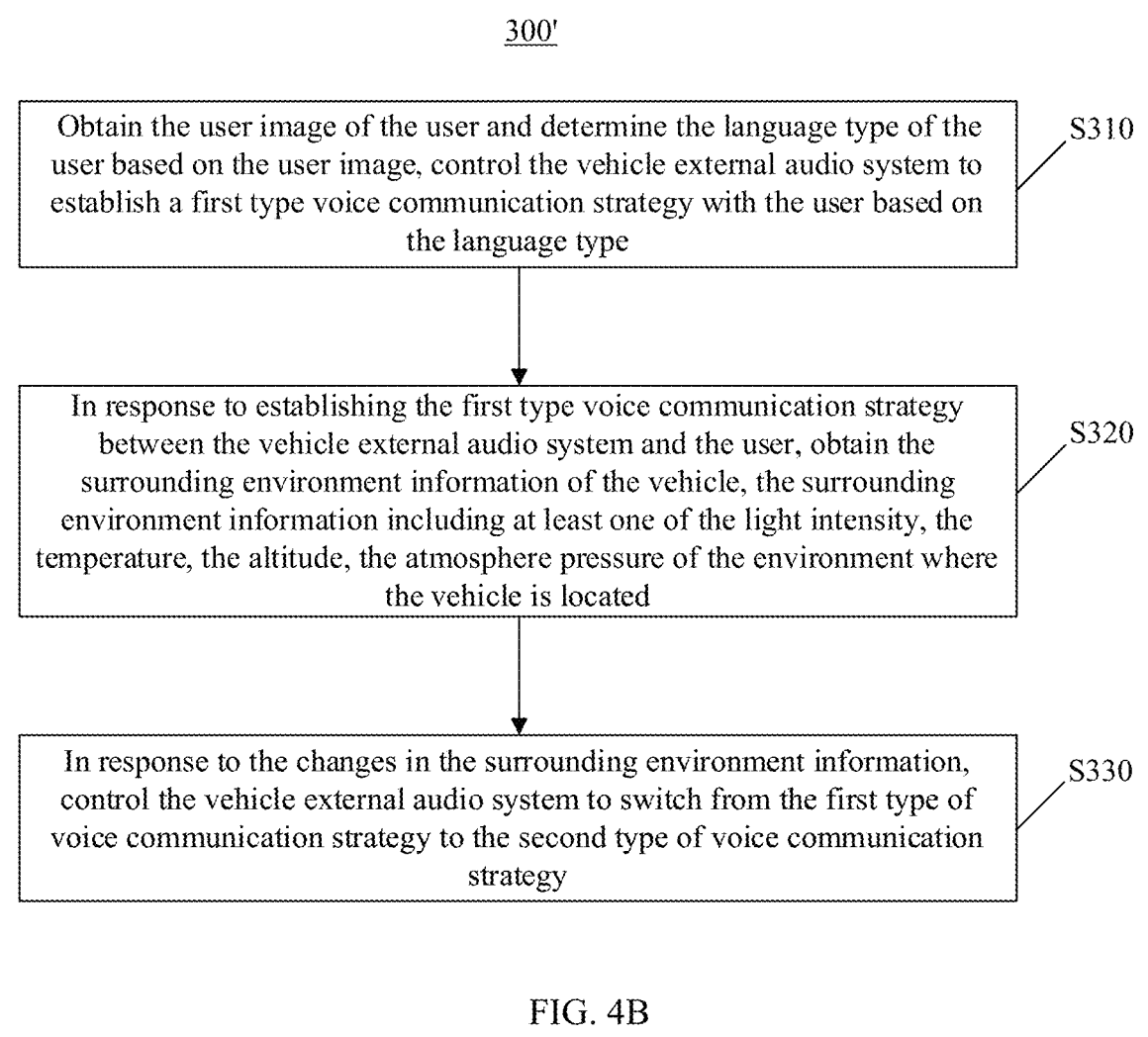

Obtain the user image of the user and determine the language type of the user based on the user image, control the vehicle external audio system to establish a first type voice communication strategy with the user based on the language type

S310

In response to establishing the first type voice communication strategy between the vehicle external audio system and the user, obtain the surrounding environment information of the vehicle, the surrounding environment information including at least one of the light intensity, the temperature, the altitude, the atmosphere pressure of the environment where the vehicle is located

S320

In response to the changes in the surrounding environment information, control the vehicle external audio system to switch from the first type of voice communication strategy to the second type of voice communication strategy

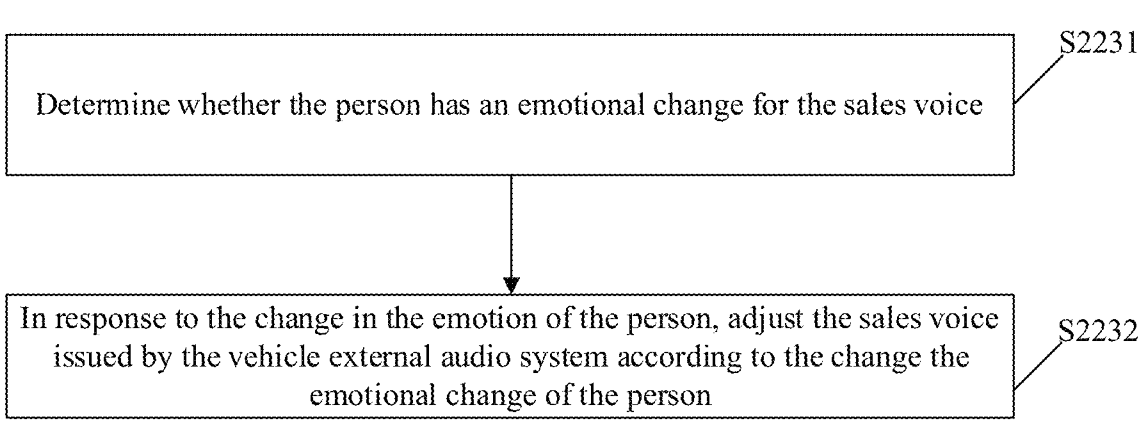
FIG. 9
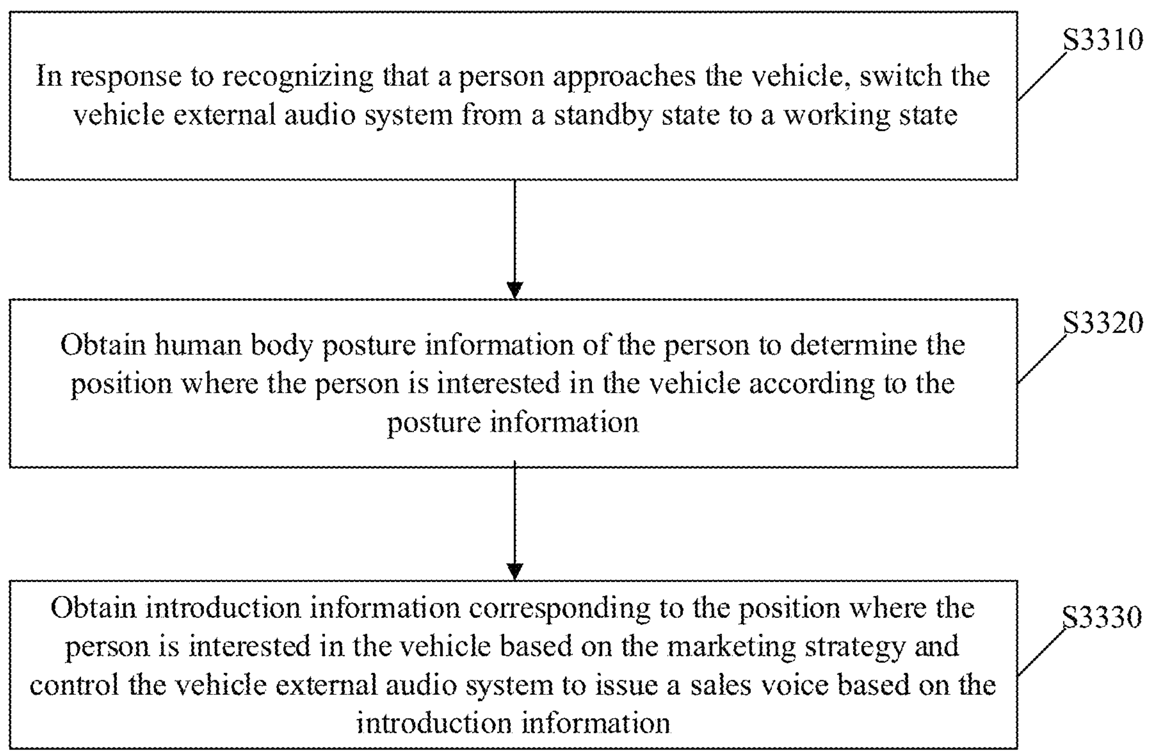
FIG. 10

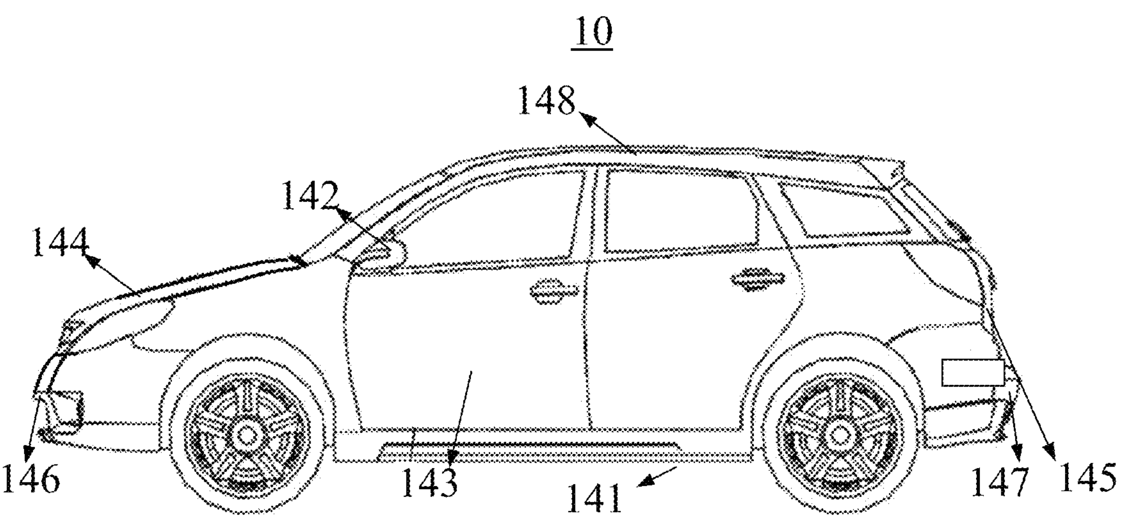
FIG. 13 144-101
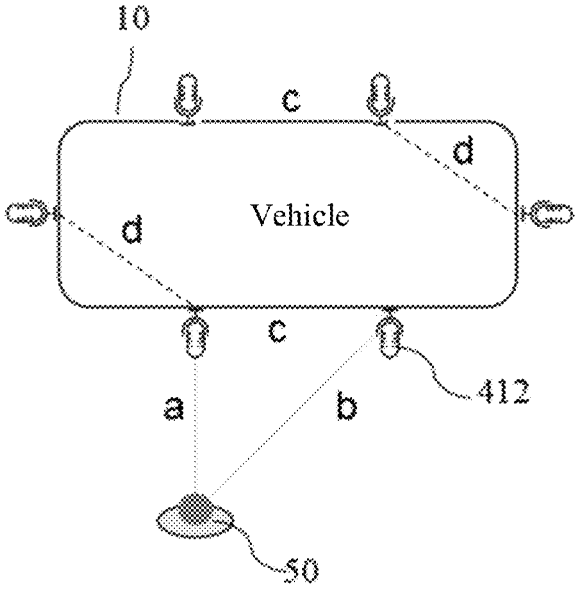
FIG. 14

CONTROL METHOD BASED ON VEHICLE EXTERNAL AUDIO SYSTEM, VEHICLE INTELLIGENT MARKETING METHOD, ELECTRONIC APPARATUS, AND STORAGE MEDIUM

CROSS-REFERENCE TO RELATED APPLICATION

This application is a continuation of International Application No. PCT/CN2023/091961, filed on May 4, 2023, which claims priority to Chinese Patent Application No. 202210643860.1, filed on Jun. 8, 2022, and Chinese Patent Application No. 202210643266.2, filed on Jun. 8, 2022, the entire contents of both of which are incorporated herein by reference.

TECHNICAL FIELD

The present disclosure relates to the vehicle-related technology field and, more particularly, to a control method based on a vehicle external audio system, a smart vehicle marketing method, an electronic apparatus, and a storage medium.

BACKGROUND

The automobile industry continues to develop vehicles with more networking and intelligence capacities. Some existing vehicles already have the vehicle sound function. How an interaction can be performed between a person and the vehicle based on the vehicle sound function is one of the current research directions of the automobile industry.

SUMMARY

Embodiments of the present disclosure provide a control method of a vehicle external audio system. The method includes, in response to the vehicle external audio system establishing a first type voice interaction strategy with a person, obtaining a plurality of biological features of the person performing voice interaction with the vehicle external audio system, determining emotion of the person according to a change of the plurality of biological features, and, in response to the emotion of the person changing, controlling the vehicle external audio system to switch from the first type voice interaction strategy to a second type voice interaction strategy, or in response to the vehicle external audio system establishing the first type voice interaction strategy with the person, obtaining surrounding environment information of a vehicle, the surrounding environment information including at least one of light intensity, temperature, altitude, or atmosphere pressure of an environment where the vehicle is located, and in response to the surrounding environment information changing, controlling the vehicle external audio system to switch from the first type voice interaction strategy to the second type voice interaction strategy.

Embodiments of the present disclosure provide a vehicle intelligent marketing method. The method includes, in response to recognizing that a person approaches a vehicle, switching a vehicle external audio system from a standby state to a working state, and controlling the vehicle external audio system to perform voice interaction with the person based on a predetermined marketing strategy.

Embodiments of the present disclosure provide an electronic apparatus, including at least a processor and a memory. The memory is communicatively coupled to the processor and stores an instruction that, when the instruction is executed by the processor, causes the processor to, in response to the vehicle external audio system establishing a first type voice interaction strategy with a person, obtain a plurality of biological features of the person performing voice interaction with the vehicle external audio system, determine emotion of the person according to a change of the plurality of biological features, and, in response to the emotion of the person changing, control the vehicle external audio system to switch from the first type voice interaction strategy to a second type voice interaction strategy, or in response to the vehicle external audio system establishing the first type voice interaction strategy with the person, obtain surrounding environment information of a vehicle, the surrounding environment information including at least one of light intensity, temperature, altitude, or atmosphere pressure of an environment where the vehicle is located, and in response to the surrounding environment information changing, control the vehicle external audio system to switch from the first type voice interaction strategy to the second type voice interaction strategy.

BRIEF DESCRIPTION OF THE DRAWINGS

FIG. 4A is a schematic diagram of a control method of a vehicle external audio system according to some embodiments of the present disclosure.

FIG. 4B is a schematic diagram of a control method of a vehicle external audio system according to some embodiments of the present disclosure.

FIG. 9 is a schematic flowchart of controlling the vehicle external audio interaction system to broadcast vehicle introduction according to some embodiments of the present disclosure.

FIG. 10 is a schematic flowchart of another vehicle smart marketing method according to some embodiments of the present disclosure.

FIG. 13 is a schematic diagram showing a mounting position of a panel sound module according to some embodiments of the present disclosure.

FIG. 14 is a schematic diagram showing sound field following according to some embodiments of the present disclosure.

DETAILED DESCRIPTION OF EMBODIMENTS

Figure 1A:
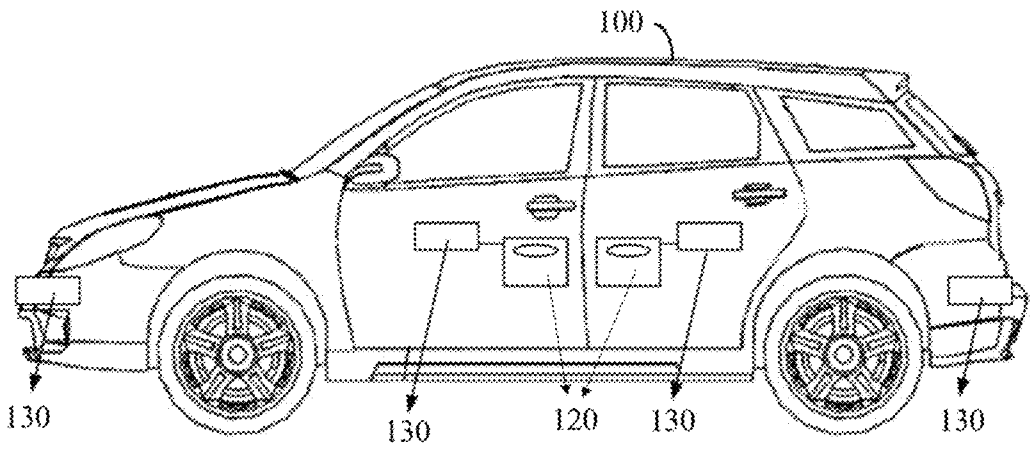
FIG. 1A is a schematic diagram of a vehicle according to some embodiments of the present disclosure.

To better understand the present disclosure, various aspects of the present disclosure are described in detail with reference to the accompanying drawings. These detailed descriptions are only descriptions of exemplary embodiments of the present disclosure and are not intended to limit the scope of the present disclosure. Throughout the specification, same reference numerals refer to same elements. The expression "and/or" can include any and all combinations of one or more of associated listed items.

In the specification, expressions such as first, second, etc., are only used to separate one feature from another feature and do not represent any limitation on the features, especially do not represent any sequence. For example, without departing from the teaching of the present disclosure, a first predetermined database of the present disclosure can also be referred to as a second predetermined database, and a second predetermined database can also be referred to as a first predetermined database.

Expressions such as "comprise," "include," "have," "contain," and/or "comprising" in the specification are open rather than closed expressions, which indicates that stated features, devices, and/or members exist. However, one or more other features, devices, members, and/or a combination thereof cannot be excluded. In addition, the term "exemplary" is intended to refer to an example or embodiment.

Unless otherwise defined, all terms (including technical terms and scientific terms) used herein have the same meaning as commonly understood by those of ordinary skill in the art. The term (e.g., the terms defined in a commonly used dictionary) can be interpreted to have a meaning consistent with the meaning in the context of the related technology. The term should not be interpreted with idealized or overly formal meanings unless specified in the present disclosure.

When there is no conflict, embodiments of the present disclosure and features in embodiments can be combined with each other. In addition, unless specified or contradictory to the context, the specific steps included in the method described in the present disclosure are not necessarily limited to the recited order but can be performed in any order or in parallel. The present disclosure is described in detail below with reference to the accompanying drawings and embodiments.

In general, a vehicle can emit sound based on a sound device and can also collect surrounding sound information based on a sound detection device. When the vehicle includes an audio system including a sound device and a sound detection device, the vehicle can perform voice interaction with a user in or around the vehicle by the audio system. The audio system can also be further refined into an inside-vehicle audio system and an outside-vehicle audio system. The vehicle can communicate with a user in the vehicle through the inside-vehicle audio system and with a user around the vehicle through the outside-vehicle audio system. In some embodiments, a voice interaction strategy established for a user based on the outside-vehicle audio system is usually a fixed voice interaction strategy. That is, a voice interaction strategy is predetermined for the user or specified for the user according to a system default setting. The communication strategy does not change during the human-vehicle voice interaction. The human-vehicle voice interaction based on the fixed voice interaction strategy cannot bring the user with intelligent interaction experience. The interaction method is relatively single and boring, which results in poor user interaction experience.

To at least partially solve one or more of the above problems and other potential problems, some exemplary embodiments of the present disclosure provide a control method of the outside-vehicle audio system, with which the voice interaction strategy can be adjusted in real-time based on user emotion or a surrounding environment during the interaction process.

Figure 1B:
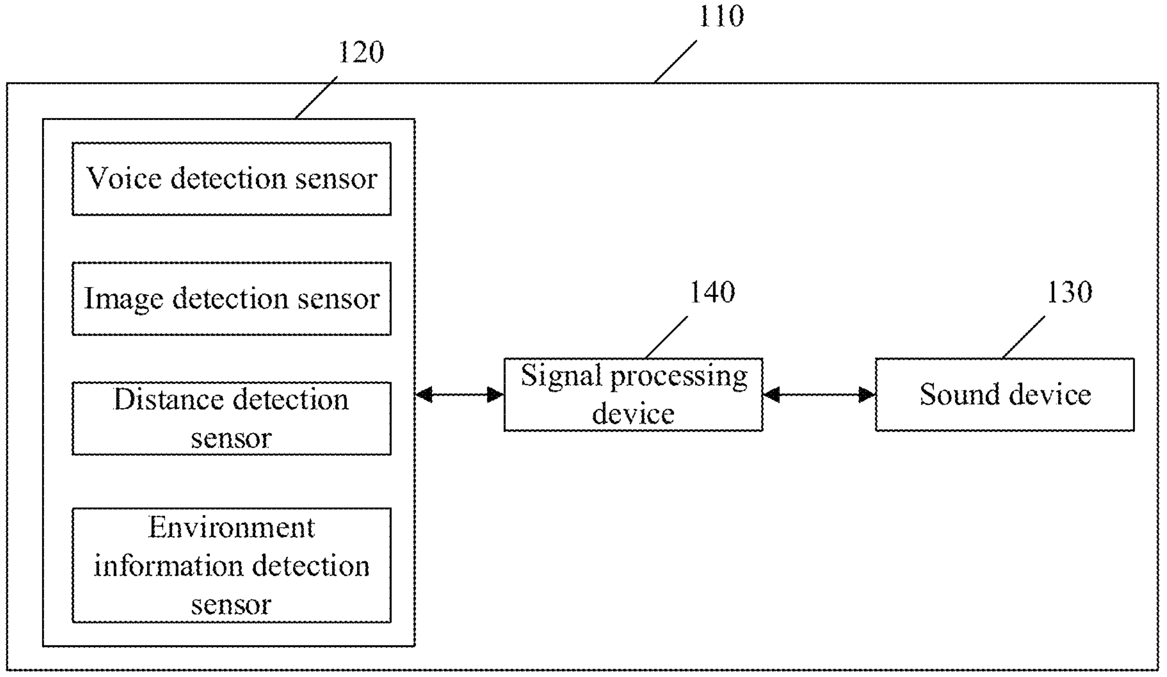
FIG. 1B is a schematic block diagram of a vehicle external audio system according to some embodiments of the present disclosure.

FIG. 1A is a schematic diagram of a vehicle 100 according to some embodiments of the present disclosure. FIG. 1B is a schematic block diagram of a vehicle external audio system 110 according to some embodiments of the present disclosure. As shown in FIG. 1A and FIG. 1B, the vehicle 100 is equipped with the vehicle external audio system 110 configured to support voice interaction between the vehicle 100 and a user outside the vehicle. The vehicle external audio system 110 includes a detection device 120, a sound device 130, and a signal processing device 140. The detection device 120 and the sound device 130 can be connected to the signal processing device 140. The detection device 120 includes, but is not limited to, a voice detection sensor, an image detection sensor, a distance detection sensor, and an environment information detection sensor. The signal processing device 140 can be communicatively connected to the detection device 120, can obtain, for example, voice data, image data, distance data, and/or environment data from the detection device 120, and can generate an audio signal based on the obtained data. For example, the signal processing device 140 can perform analysis on the data obtained from the detection device 120 to determine a voice interaction strategy based on which voice interaction with the user outside the vehicle is established or determine whether the voice interaction strategy needs to be switched to another voice interaction strategy after the voice interaction strategy is established. The sound device 130 can be communicatively connected to the signal processing device 140 and can sound under the excitation of the audio signal generated by the signal processing device 140.

In some embodiments, the signal processing device 140 can be configured to determine information such as a user change, a user emotional change, or a surrounding environment information change of the vehicle based on the detection data acquired by the detection device 120 and generate the audio signal. The sound device 130 can be configured to sound to the outside under the excitation of the audio signal to realize the interaction with the user. That is, in embodiments of the present disclosure, the voice interaction strategy of the vehicle external audio system 110 can be dynamically adjusted by sensing information such as the user change, the user emotional change, or the surrounding environment information change of the vehicle. Thus, the user can have a more intelligent interaction experience with the vehicle. In addition, since the control method of the vehicle external audio system can adjust the voice interaction strategy in real-time based on the emotion of the user, the vehicle can be more attractive to the user.

The detection device 120 can include the voice detection sensor, such as an element including a microphone having a voice collection function. The voice detection sensor can be configured to generate voice data. The detection device 120 can further include the image detection sensor, such as a camera having an image collection function. The image detection sensor can be configured to generate image data. In some embodiments, the detection device 120 can further include the distance detection sensor, for example, at least a time of flight (TOF) sensor, which is an element configured to perform distance measurement based on TOF. Some artificial light sources are generally required for the TOF sensor to perform a distance measurement. The TOF sensor can calculate a distance between the object and the TOF sensor by measuring "time of flight" of ultrasonic, microwave, and optical signals between the emitter and reflector. The TOF sensor can be a TOF sensor that performs distance measurement through infrared or laser or another sensor. The detection device 120 can also include the environment detection sensor configured to detect environmental information parameters such as light intensity, temperature, altitude, and/or atmosphere pressure of the surrounding environment of the vehicle.

Figure 2:
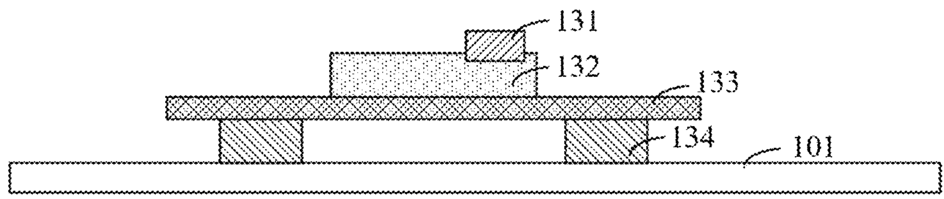
FIG. 2 is a schematic diagram of a piezoelectric speaker according to some embodiments of the present disclosure.

The sound device 130 can be arranged on at least one of a door panel, a hood, a trunk lid, a roof cover, a chassis, a rear view mirror, a front bumper, or a rear bumper of the vehicle 100. The sound device 130 can be, for example, a speaker and/or a panel sound module. In some embodiments, the sound device 130 can be the panel sound module, such as a piezoelectric panel sound module including a piezoelectric ceramic speaker. FIG. 2 is a schematic structural diagram of the piezoelectric ceramic speaker according to some embodiments of the present disclosure. The piezoelectric ceramic speaker includes an electrode piece 131 configured to receive an excitation voltage from a drive circuit. The electrode piece 131 can be a pair of positive and negative electrode sheets. The piezoelectric ceramic speaker also includes a piezoelectric ceramic 132 configured to generate lateral or longitudinal extension or retraction under the excitation voltage received through the electrode piece 131. The excitation voltage can be a high-frequency square wave with alternating polarities. Thus, the piezoelectric ceramic 132 can generate mechanical deformation under the square wave with alternating polarities, that is, extension or retraction. In addition, the piezoelectric ceramic 132 can be transversely or longitudinally polarized piezoelectric ceramic. Thus, transverse or longitudinal mechanical deformation can be generated under the excitation voltage. The piezoelectric ceramic speaker can further include a vibration plate 133, which is attached to the piezoelectric ceramic 132 and vibrates as the piezoelectric ceramic 132 extends or retracts. Thus, the piezoelectric ceramic speaker can convert the input excitation voltage into vibrations to emit sound. The vibration plate 133 can be attached to a member such as a door panel of the vehicle to drive the member such as the door panel to vibrate.

The piezoelectric ceramic speaker further includes a vibration gasket 134 arranged between the vibration plate 133 and the door panel 101. In some embodiments, the vibration gasket 134 can be glue used to bond the vibration plate 133 and the door panel 101. In addition, in some embodiments, the piezoelectric ceramic speaker can include a plurality of piezoelectric ceramics 132 and a plurality of corresponding pairs of electrode sheets. For example, a piezoelectric ceramic 132 can be arranged on each of the upper and lower sides of the vibration plate 133. The piezoelectric ceramics 132 can extend and retract in opposite directions under the action of the electrode pieces 131, respectively to enhance the vibration effect. The sound field of the vehicle can be broader by emitting sound to the outside through the sound device 130.

Figure 3A:
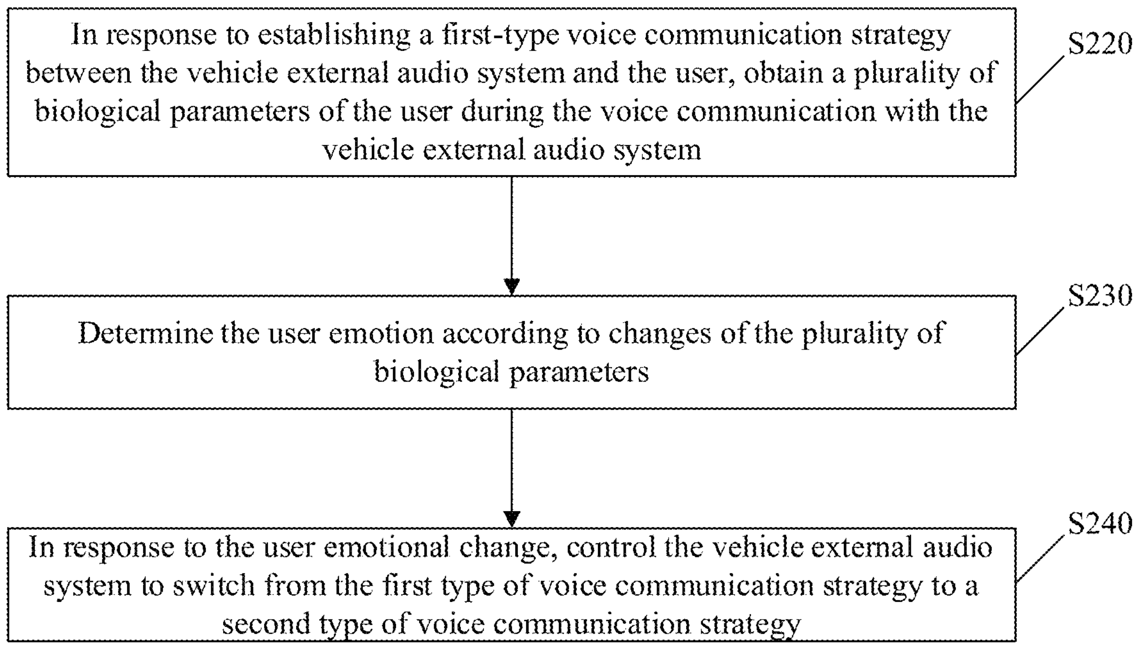
FIG. 3A is a schematic diagram of a control method of a vehicle external audio system according to some embodiments of the present disclosure.
Figure 3B:
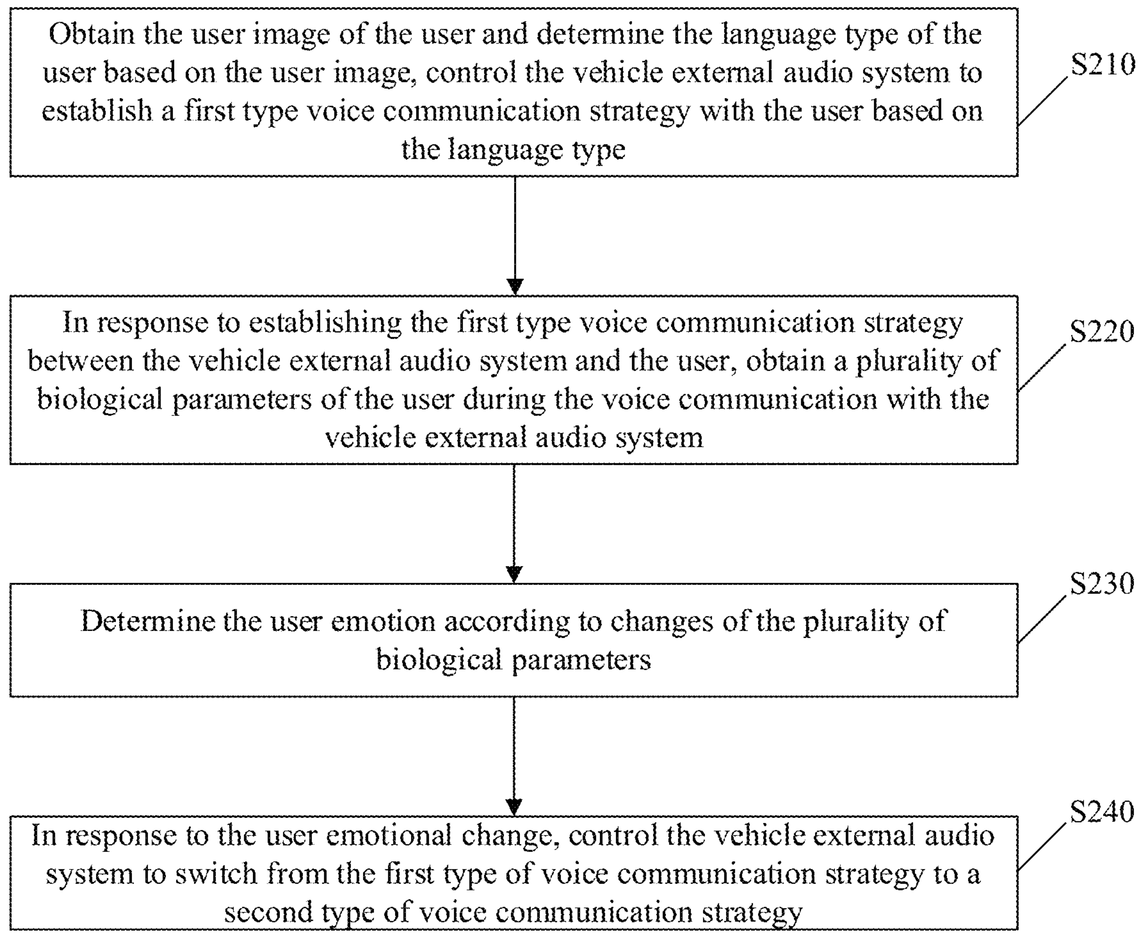
FIG. 3B is a schematic diagram of a control method of a vehicle external audio system according to some embodiments of the present disclosure.

FIG. 3A is a schematic diagram of a control method 200 of a vehicle external audio system according to some embodiments of the present disclosure. FIG. 3B is a schematic diagram of a control method 200' of a vehicle external audio system according to some embodiments of the present disclosure. The control method 200 and the control method 200' of the vehicle external audio system can be executed by an electronic apparatus such as a controller of the vehicle 100. The method 200 and the method 200' can also include additional steps not shown and/or steps shown that can be omitted. The scope of the present disclosure is not limited here. The control method 200 and the control method 200' can be applied to an application scene such as a self-sale scene of the vehicle 100, a shared car scene, a social scene, an information broadcast scene, or a traditional adaptation scene. The control method 200 and the control method 200' can also be applied to another type of application scene.

The self-sale scene can refer to a scene in which the vehicle introduces vehicle functions autonomously to a surrounding user. In this scene mode, the vehicle can autonomously introduce the vehicle functions to the user, including but not limited to a driving attribute, an entertainment function, a safety function, etc. When the vehicle performs self-sale based on the control method of the vehicle external audio system of embodiments of the present disclosure, the voice interaction strategy can be matched for different users based on user features. In the introduction process, based on an obtained biological feature of the user, the user emotional change can be determined. Thus, the communication strategy can be adjusted in real-time. For example, when the vehicle autonomously introduces the entertainment function, if the vehicle determines that the user has a high degree of interest based on the obtained biological feature, the vehicle can introduce the entertainment function in detail. If the vehicle determines that the user has a low degree of interest based on the obtained biological feature, the vehicle can try to increase the degree of interest of the user by changing voice speed, voice intonation, and/or theme tone, or skip the introduction of the entertainment function and change to introduce the driving attribute or the safety function to try to attract the user. The vehicle self-sale can be performed based on the control method of the vehicle external audio system of embodiments of the present disclosure, which can be helpful to provide specialized and customized service according to user needs.

The shared car scene can refer to a scene in which the car actively starts a conversation when the user uses a shared/rented car. When the vehicle actively starts a conversation based on the control method of the vehicle external audio system of embodiments of the present disclosure, a special voice interaction strategy can be matched with the user based on the surrounding environment information and/or the user attribute feature. That is, for different types of users, different voice interaction strategies can be provided to realize an intelligent voice effect.

The social scene can refer to a scene in which the vehicle actively starts a conversation to introduce itself. As vehicles become increasingly network-connected and intelligent, the vehicle can be developed with some human attributes. For example, in some scenes, the vehicle can actively introduce itself and introduce information such as the vehicle name, the serial number, or the vehicle condition to the surrounding user. When the vehicle introduces itself based on the control method of the vehicle external audio system of embodiments of the present disclosure, a special voice interaction strategy can be matched for the user based on, for example, the surrounding environment information and/or the user attribute feature. That is, for different types of users, different voice interaction strategies can be provided to realize the intelligent voice effect.

The information broadcasting scene can refer to a scene in which the vehicle broadcasts the vehicle condition to the vehicle owner. When the vehicle senses that the owner is approaching the vehicle, the vehicle can actively broadcast vehicle condition information to the owner, such as remaining fuel, remaining power, tire wear, and/or whether the vehicle is abnormal. When the vehicle broadcasts information based on the control method of the vehicle external audio system of embodiments of the present disclosure, different language broadcast styles can be used for different vehicle owners to cause the broadcast service to be more customized.

The tradition adaptation scene can refer to a scene in which the vehicle broadcasts the surrounding environment information when a vehicle following mode is turned on. For example, when the user is visiting a scenic spot, the vehicle following mode of the vehicle can be turned on to follow the user to move. In the vehicle following mode, the vehicle can introduce the surrounding scenery in real-time based on the positioning information. When the vehicle broadcasts the surrounding environment information based on the control method of the vehicle external audio system of embodiments of the present disclosure, a special voice interaction strategy can be matched for the user based on, for example, the surrounding environment information and/or the user attribute feature. That is, different voice interaction strategies can be provided to realize the intelligent voice effect.

As shown in FIG. 3A and FIG. 3B, the control method 200 and the control method 200' of the vehicle external audio system includes, in response to establishing a first-type voice interaction strategy between the vehicle external audio system and the user, obtaining a plurality of biological features of the user during the voice interaction with the vehicle external audio system (S220), determining the user emotion according to changes of the plurality of biological features (S230), and in response to the user emotional change, controlling the vehicle external audio system to switch from the first type of voice interaction strategy to a second type of voice interaction strategy (S240).

In the method of embodiments of the present disclosure, the emotion of the user can be determined through the change of the plurality of biological features during the voice interaction between the user and the vehicle external audio system. Then, the voice interaction strategy of the vehicle external audio system can be dynamically adjusted through the user emotional change. Thus, the voice interaction strategy can be more humanized and can provide the user with better intelligent interaction experience.

In addition, in embodiments shown in FIG. 3B, before process S220, a user image of the user can also be obtained, and a user language type can be determined based on the user image. As shown in process S210 of FIG. 3B, the vehicle external audio system can be controlled to establish the first type of voice interaction strategy with the user based on the language type.

In the method of embodiments of the present disclosure, the corresponding language type can be matched for an unspecified user through the above user image, and the voice interaction strategy of the vehicle external audio system can be adjusted according to the above language type. Thus, the vehicle external audio system can satisfy the customized needs of the unspecified user and bring a more intelligent interaction experience to the unspecified user.

Processes S210 to S240 of embodiments of the present disclosure are illustrated below.

At S210, the user image of the user is obtained, and the language type of the user is determined based on the user image.

Firstly, in response to the user triggering the vehicle external audio system, the user image including the user face is obtained. For example, when the distance between the user and the vehicle is less than a predetermined distance, the vehicle external audio system can be triggered, the user image including the user face can be captured by an image sensor arranged at the vehicle. For example, when the TOF sensor arranged at the vehicle detects that the distance between the user and the vehicle is less than the predetermined distance, the controller of the vehicle can send an instruction of the user triggering the vehicle external audio system to the vehicle external audio system. The vehicle external audio system can be turned on. The predetermined distance can be, for example, 0 m to 5 m. In response to the user triggering the vehicle external audio system, the controller of the vehicle can send an instruction of obtaining the user image of the user to the image sensor. The image sensor can obtain the user image of the user.

Then, whether a language type corresponding to the captured user image can be determined in a first predetermined database. The first predetermined database can include a paired database for the user image and the language type of the user. The first predetermined database can include user registration information and/or predetermined information. For example, when the user registers for the first time or subsequently uses a relevant application program of the vehicle, the user can reserve facial image information and preference settings. The preference settings can include but are not limited to the language preference. The first predetermined database can store the facial image information and the preference settings corresponding to the facial image information. After the user facial image is obtained, the obtained facial image can be compared with the facial image stored in the first predetermined database. When the facial image stored in the first predetermined database is determined to be identical to the obtained facial image, the language type stored in the first predetermined database corresponding to the same user facial image can be set as the language type of the user. That is, in response to the language type corresponding to the obtained user image existing in the first predetermined database, the language type corresponding to the user image can be set as the language type of the user. The language type can include but is not limited to languages of different countries or local dialects.

A language type corresponding to the captured user image does not exist in the first predetermined database, the user attribute feature can be extracted from the user image. The user language type can be determined based on the above attribute feature. The attribute feature can include at least one of user gender, age range, wearing features, or country and/or region of origin. The language type can include but is not limited to languages of different countries, local dialects, or language themes. The language themes can include but are not limited to a cartoon voice, a Lolita voice, a young woman voice, a mature woman voice, a youth voice, a young man voice, or a middle-aged voice.

For example, when the language type corresponding to the captured user image does not exist in the first predetermined database, the controller of the vehicle can send an instruction used to extract at least an attribute feature of the gender, age range, wearing features, or the country and/or region of origin from the user image and determine the language type of the user based on the attribute feature and the second predetermined database. The second predetermined database can be obtained by calculation according to the gender, age range, wearing features, and country and/or region of origin of the user, and the user language type that are pre-obtained from different users. The language type of the user can be determined from the second predetermined database according to at least one attribute feature of the user gender, age range, wearing features, or country and/or region of origin. For example, when the country of origin of the user is China, the language type of the user can be Mandarin. When the region of origin of the user is Guangdong, the language type of the user can be Cantonese. When the country of origin is China, the gender is female, and the age range is 22 to 30 years old, the language type of the user can be Mandarin in the mature woman voice. When the country of origin is China, the gender is male, and the age range is 25 to 35 years old, the language type of the user can be Mandarin in a young man voice. When the country of origin is the United Kingdom or the United States, the gender is female, and the wearing feature is Lolita, the language type of the user can be English in a Lolita voice.

The above user image and the language type of the user determined based on the above attribute feature can be uploaded to the first predetermined database to dynamically update the first predetermined database.

In some other embodiments of the present disclosure, if the language type corresponding to the captured user image does not exist in the first predetermined database, the attribute feature of the user can be extracted from the user image. An initial language type of the user can be predetermined based on the attribute feature. Then, the user voice data can be collected, and the language feature of the user can be extracted from the voice data. The initial language type can be corrected based on the language feature to determine the language type of the user. The language feature can include but is not limited to the cartoon voice, Lolita voice, young woman voice, mature woman voice, youth voice, young man voice, middle-aged voice, Mandarin, Cantonese, or the user language features from the voice data, and modify the initial language type based on the language features to determine the user's language type, wherein the language features include but are not limited to the cartoon voice, Lolita voice, young woman voice, mature woman voice, youth voice, young man voice, or middle-aged voice, Mandarin, Cantonese, or Minnan language.

For example, in response to the language type corresponding to the captured user image does not exist in the first predetermined database, the initial language type of the user can be determined from the second predetermined database according to at least one attribute feature of the user gender, the age range, the wearing features, or the country and/or region of origin. Then, the initial language type of the user can be corrected according to the user language feature to determine the language type of the user. For example, when the country of origin of the user is China, the gender is female, and the age range is 22 to 30 years old, the initial language type of the user can be Mandarin in the mature woman voice. When the user language feature is Minnan language, the language type of the user can be Minnan language in the mature woman voice. When the user language feature is the Lolita voice and Minnan language, the language type of the user can be Minnan language in the Lolita voice.

The above user image and the language type of the user determined based on the above attribute feature and language feature can be uploaded to the first predetermined database to dynamically update the first predetermined database.

In some other embodiments of the present disclosure, the corresponding language type can be matched as the language type of the user according to the user attribute features extracted from the above user image and the pre-established attribute feature-language type matching library type. The construction method of the pre-established attribute feature-language type matching library can include dividing all users into a plurality of groups based on the attribute features of the user gender, the age range, the wearing features, the country and/or region of origin and matching a corresponding language type for each group. Users from different groups can have different language types. For example, when the country of origin of the user is China, the gender is female, the age range is 22 to 30 years old, and the wearing feature is Lolita style, the language type of the user can be Mandarin in the Lolita voice. When the region is Guangdong, and the gender is male, the age range is 25 to 35 years old, and the wearing feature is young man style, the language type of the user can be Cantonese in the young man voice. When the country of origin of the user is the United Kingdom or the United States, the gender is female, the age range is 22 to 30 years old, and the wearing feature is a mature woman style, the language type of the user can be English in the mature woman voice.

In some embodiments, the wearing feature can include but is not limited to, user dressing style, accessory matching, etc. With the vehicle external audio system, for example, the user occupation, taste, and/or consumption level can be determined based on the user wearing feature extracted from the user image to provide the user with a more appropriate voice interaction strategy. For example, in the vehicle self-sale scene, the factor of wearing feature can be appropriately increased in a proportion of factors, with which the voice interaction strategy can be determined. Thus, a customized sale style can be applied for different groups of people, which is helpful to find potential customers.

In some other embodiments, the surrounding environment information of the vehicle can also be obtained. The surrounding environment information can include at least one of light intensity, temperature, altitude, and atmosphere pressure of the environment where the vehicle is located. Then, the language type of the user can be determined based on the user attribute characteristic extracted from the user image and the surrounding environment information. The language type can include but is not limited to the languages of different countries, the local dialects, or the language themes. The language themes can include but are not limited to cartoon sounds, Lolita voice, young woman voice, mature woman voice, youth voice, young man voice, or middle-aged voice. For example, when the light intensity of the environment where the vehicle is located is weak, the language type of the user should avoid using low-pitched or other language types that can easily cause fear. The language type of the user can be adjusted through changes in the surrounding environment information of the vehicle to further adjust the voice interaction strategy of the vehicle external audio system. Thus, the voice interaction strategy of the vehicle external audio system can be adapted to the surrounding environment information to provide the user with the more intelligent interaction experience.

Without departing from the teaching of the present disclosure, the language type of the user can also be determined through other implementation manners, which are not limited in the present disclosure.

At S220, in response to establishing the first-type voice interaction strategy between the vehicle external audio system and the user, the plurality of biological features of the user are obtained during the voice interaction between the user and the vehicle external audio system.

In some embodiments, when the first type voice interaction strategy is established between the vehicle external audio system and the user, the controller of the vehicle can send the instruction used to obtain the plurality of biological features of the user during the voice interaction with the vehicle external audio system. The plurality of biological features can include at least one of user facial expression of the plurality of facial images or user voice of a plurality of pieces of voice data. The user facial expression can include but is not limited to an opening degree of eyes, an opening degree of a mouth, a degree of stretching of a face, or a degree of distraction. The facial image can be obtained by the image sensor. The voice data can be obtained by the voice detection sensor.

At S230, the user emotion is determined according to the changes of the plurality of biological features.

In some embodiments, the plurality of pieces of voice data can be firstly recognized. A first emotional feature of the user can be determined according to changes in the user voice in the plurality of pieces of voice data. For example, the plurality of pieces of voice data can be uploaded to a cloud voice recognition module. The cloud voice recognition module can be configured to determine the changes in the user voice from the plurality of pieces of voice data and determine the first emotional feature of the user based on the changes in the user voice. The cloud speech recognition module can further be configured to convert the plurality of pieces of voice data into text information and perform word segmentation and semantic analysis on the text information to determine the changes in the user voice and further determine the first emotional feature of the user. The first emotional feature can include, but is not limited to, "joyful," "excited," "surprised," "frustrated," "sad," "angry," "anxious," or "non-semantic feature."

Then, the plurality of facial images can be recognized. A second emotional feature of the user can be determined according to changes in the user facial expressions of the plurality of facial images. Similarly, the plurality of facial images can also be uploaded to the cloud. Then, the changes in the user facial expressions such as the opening degree of the eyes, the opening degree of the mouth, the degree of the stretching of the face, and the degree of distraction can be extracted from the plurality of facial images through a facial image recognition module set in the cloud. The second emotional feature of the user can be determined based on the changes in the user facial expressions. The second emotional feature can include but is not limited to emotional features such as "joyful," "excited," "surprised," "frustrated," "sad," "angry," and "anxious," features that represent emotional degrees such as "very" or "general," and "non-expression feature."

Then, the emotion of the user can be determined according to the first emotional feature and the second emotional feature. In some embodiments, when there is no conflict between the first emotional feature and the second emotional feature, the second emotional feature can be set as the emotion of the user. When there is a conflict between the first emotional feature and the second emotional feature, the features that represent the degree of the emotion in the first emotional feature and the second emotional feature can be combined and set as the emotion of the user. In addition, when there is a conflict between the first emotional feature and the second emotional feature, and the first emotional feature is a "non-semantic feature" or the second emotional feature is a "non-expression feature," the first emotional feature can be set as the emotion of the user.

For example, if the first emotional feature is "joyful" and the second emotional feature is "very joyful" or "generally joyful," then there is no conflict between the first emotional feature and the second emotional feature. The emotion of the user can be the second emotional feature. When the first emotional feature is a "non-semantic feature," and the second emotional feature is any of the above features, the emotion of the user can be a "non-semantic feature." When the first emotional feature is any feature except the "non-semantic feature," and the second emotional feature is a "non-expression feature," the emotion of the user can be any first emotional feature except the "non-semantic feature."

Without departing from the teaching of the present disclosure, the emotion of the user can also include other emotional features, which are not limited by the present disclosure.

At S240, in response to the changes in the emotion of the user, the vehicle external audio system can be controlled to switch from the first type voice interaction strategy to the second type voice interaction strategy.

In some embodiments, the vehicle external audio system can be caused to switch from the first type voice interaction strategy to the second type voice interaction strategy by adjusting the parameters of the language mode of the vehicle external audio system. The parameters of the language mode can include at least one of intonation, speech rate, and theme tone of the language mode. For example, when the emotion of the user is a "non-semantic feature," the motion of the user does not change, and the at least one parameter of the intonation, speech rate, and theme tone of the language mode is not adjusted. When the motion of the user is the second emotional feature or any first emotional feature except the "non-semantic feature," the emotion of the user changes, and the at least one parameter of the intonation, speech rate, and theme tone of the language mode can be adjusted. Thus, the vehicle external audio system can be caused to switch from the first type voice interaction strategy to the second type voice interaction strategy. When the emotion of the user is "joyful" or "excited," the intonation can become higher, and the speech rate can be faster. When the emotion of the user is "sad" or "frustrated," the intonation can become lower, and the speech rate can be slower. Thus, the voice interaction strategy of the vehicle external audio system can adapt to the emotion of the user to provide the user with the more intelligent interaction experience.

Without departing from the teaching of the present disclosure, the vehicle external audio system can be controlled to switch from the first type voice interaction strategy to the second type voice interaction strategy in another implementation manner, which is not limited in the present disclosure.

The control method 200 and/or the control method 200' of the above vehicle external audio system can further include obtaining the surrounding environment information of the vehicle during the voice interaction between the user and the vehicle external audio system and, in response to the changes in the surrounding environment information, controlling the vehicle external audio system to perform a third type voice interaction strategy. The surrounding environment information can include at least one of the light intensity, temperature, altitude, and atmosphere pressure of the environment where the vehicle is located.

For example, in response to establishing the first type voice interaction strategy or the second type voice interaction strategy between the user and the vehicle external audio system, the surrounding environment information of at least one of the light intensity, temperature, altitude, or atmosphere pressure of the environment where the vehicle is located can be obtained during the voice interaction between the user and the vehicle external audio system. In response to the changes in the surrounding environment information, the parameters of the language mode of the vehicle external audio system can be adjusted to cause the vehicle external audio system to switch from the first type voice interaction strategy or the second type voice interaction strategy to the third type voice interaction strategy. The parameters of the language mode can include at least one of the intonation, speech rate, or theme tone of the voice mode. When the light intensity of the environment where the vehicle is located becomes weak, the theme tone of the language mode can be adjusted to avoid using a low theme tone or another theme tone that easily causes fear. When the temperature of the environment where the vehicle is located becomes higher, or the atmosphere pressure becomes higher, or the altitude becomes higher, the intonation and speech rate of the language mode can be adjusted to cause the intonation and speech rate to be relatively flat.

In the method of embodiments of the present disclosure, at least one of the intonation, speech rate, or the theme tone of the language mode of the vehicle external audio system can be dynamically adjusted through the changes in the surrounding environment information of the vehicle to realize the dynamic adjustment of the voice interaction strategy of the vehicle external audio system. Thus, the intonation, speech rate, or theme tone of the language mode of the vehicle external audio system can adapt to the surrounding environment information of the vehicle to provide the user with the more intelligent interaction experience.

In some embodiments, before process S210, the control method 200 and/or the control method 200' of the vehicle external audio system can further include, in response to triggering the self-sale mode of the vehicle, obtaining at least one of the light intensity or the temperature of the environment where the vehicle is located and dynamically adjusting the language mode of the vehicle external audio system based on the at least one of the light intensity or the temperature of the environment where the vehicle is located to realize the dynamic adjustment of the voice interaction strategy of the vehicle external audio system. The language mode can include the language type of the vehicle external audio system. For example, when the light intensity of the environment where the vehicle is located is strong, and the temperature is high, the language mode of the vehicle external audio system can be adjusted to cause the vehicle external audio system to emit sound of ocean waves. When the light intensity of the environment where the vehicle is located is strong, and the temperature is relatively appropriate, the language mode of the vehicle external audio system can be adjusted to cause the vehicle external audio system to emit bird chirping sound.

In the method of embodiments of the present disclosure, at least one of the light intensity or the temperature of the environment where the vehicle is located can be obtained when the self-sale mode of the vehicle is triggered. The language mode of the vehicle external audio system can be adjusted based on at least one of the light intensity or the temperature of the environment where the vehicle is located. Thus, the voice interaction strategy of the vehicle external audio system can be dynamically adjusted, which is helpful to improve the success rate of the vehicle self-sale.

FIG. 4A and FIG. 4B are a schematic flowchart of a control method 300/ a control method 300' of a vehicle external audio system according to some embodiments of the present disclosure. The control method 300/ the method 300' of the vehicle external audio system can be executed by the electronic apparatus such as the controller of the vehicle 100. The control method 300/ the control method 300' can also include additional steps not shown and/or steps shown that can be omitted, and the scope of the present disclosure is not limited here. The control method 300/ the control method 300' can be applied to an application scene such as the self-sale scene, the shared car scene, the social scene, the information broadcast scene, or the tradition adaptation scene. The control method 300/ the control method 300' can also be applied in another type of application scene.

As shown in FIG. 4A and FIG. 4B, the control method 300/ the control method 300' of the vehicle external audio system includes the following processes.

At S320, in response to establishing the first type voice interaction strategy between the vehicle external audio system and the user, the surrounding environment information of the vehicle is obtained. The surrounding environment information can include at least one of the light intensity, the temperature, the altitude, the atmosphere pressure of the environment where the vehicle is located.

At S330, in response to the changes in the surrounding environment information, the vehicle external audio system is controlled to switch from the first type of voice interaction strategy to the second type of voice interaction strategy.

In the method of embodiments of the present disclosure, the voice interaction strategy of the vehicle external audio system can be dynamically adjusted through the changes in the surrounding environment information of the vehicle. Thus, the voice interaction strategy of the vehicle external audio system can adapt to the surrounding environment information of the vehicle, which provides the user with the more intelligent interaction experience.

In addition, in embodiments shown in FIG. 4B, before process S320, the user image of the user is obtained, and the language type of the user is determined based on the user image. As shown in process S310 of FIG. 4B, the vehicle external audio system is controlled to establish the first type voice interaction strategy with the user based on the language type.

In the method of embodiments of the present disclosure, the corresponding language type can be matched for an unspecified user through the above user image, and the voice interaction strategy of the vehicle external audio system can be adjusted according to the language type. Thus, the voice interaction strategy of the vehicle external audio system can satisfy the customized needs of the unspecified user, which provides the user with the more intelligent interaction experience.

Processes S310 to S330 are described in some embodiments of the present disclosure.

At S310, the exemplary implementation manner of process S310 is the same as the exemplary implementation manner of process 210, which is not repeated here.

At process S310, in response to establishing the first type voice interaction strategy with the user by the vehicle external audio system, the controller of the vehicle can send an instruction for obtaining the surrounding environment information of the vehicle during the voice interaction between the user and the vehicle external audio system. The surrounding environment information can include at least one of the light intensity, temperature, altitude, or atmosphere pressure of the environment where the vehicle is located.

At S330, in response to the changes in the surrounding environment information, the vehicle external audio system is controlled to switch from the first type voice interaction strategy to the second type voice interaction strategy.

In some embodiments, if the surrounding environment information changes, the parameters of the language mode of the vehicle external audio system can be adjusted to cause the vehicle external audio system to switch from the first type voice interaction strategy to the second type voice interaction strategy. The parameters of the language mode can include at least one of the intonation, the speech rate, and the theme tone of the voice mode. When the light intensity of the environment where the vehicle is located becomes weaker, the theme tone of the language mode can be adjusted to avoid using a low theme tone or another theme tone that causes fear. When the temperature of the environment where the vehicle is located becomes higher, or the atmosphere pressure becomes higher, or the altitude becomes higher, the intonation and the speech rate of the language mode can be adjusted to cause the intonation and the speech rate to be relatively flat.

In the method of embodiments of the present disclosure, the at least one of the intonation, the speech rate, or the theme tone of the language mode of the vehicle external audio system can be adjusted through the changes in the surrounding environment information of the vehicle to dynamically adjust the voice interaction strategy of the vehicle external audio system. Thus, the intonation, the speech rate, or the theme tone of the language mode of the vehicle external audio system can adapt to the surrounding environment information of the vehicle to provide the user with the more intelligent interaction experience.

In addition, according to other embodiments of the present disclosure, before process S310, the control method 300 and/or the control method 300' of the vehicle external audio system can further include, in response to triggering the self-sale mode of the vehicle, obtaining at least one of the light intensity or the temperature of the environment where the vehicle is located and dynamically adjusting the language mode of the vehicle external audio system based on at least one of the light intensity or the temperature of the environment where the vehicle is located to dynamically adjust of the voice interaction strategy of the external audio system. The language mode can include the language type of the vehicle external audio system. For example, when the light intensity of the environment where the vehicle is located is strong, and the temperature is high, the language mode of the vehicle external audio system can be adjusted to cause the vehicle external audio system to emit the ocean wave sound. When the light intensity of the environment where the vehicle is located is strong, and the temperature is relatively appropriate, the language mode of the vehicle external audio system can be adjusted to cause the vehicle external audio system to emit the bird chirping sound.

In the method of embodiments of the present disclosure, when the self-sale mode of the vehicle is triggered, the at least one of the light intensity or the temperature of the environment where the vehicle is located can be obtained. The language mode of the vehicle external audio system can be dynamically adjusted based on the at least one of the light intensity or the temperature of the environment where the vehicle is located to dynamically adjust the voice interaction strategy of the vehicle external audio system, which helps improve the success rate of vehicle self-sale.

Embodiments of the present disclosure further provide an electronic apparatus. The electronic apparatus can include at least one processor and a memory communicatively connected to the at least one processor. The memory can store instructions executable by the at least one processor. When the instructions are executed by the at least one processor, the at least one processor can be caused to execute the above control method of the vehicle external audio system.

Embodiments of the present disclosure further provide a non-transitory computer-readable storage medium. The storage medium can store machine-executable instructions that, when executed by a machine, cause the machine to execute the above control method of the vehicle external audio system.

Figure 5:
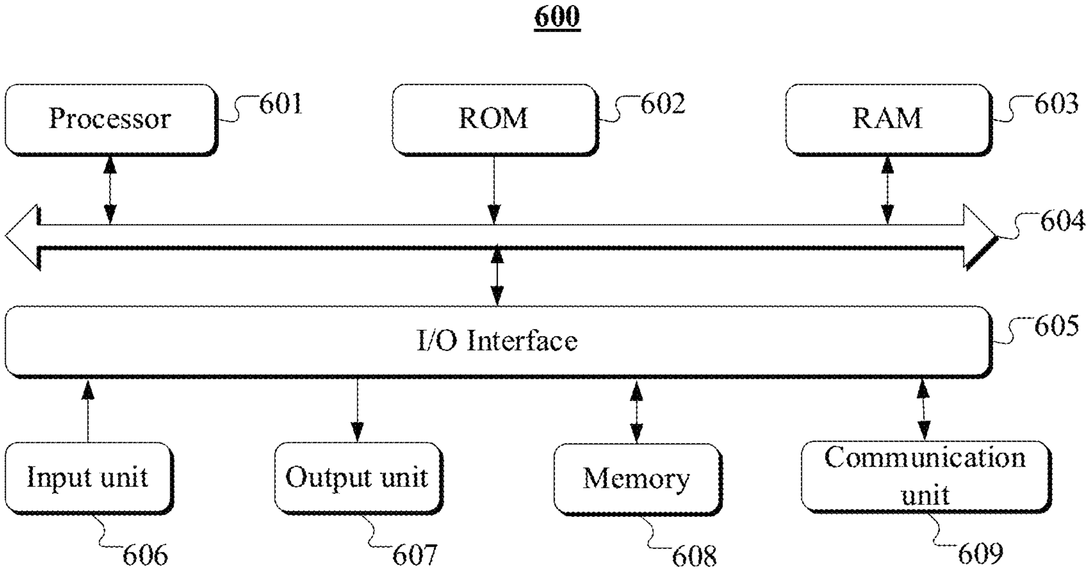
FIG. 5 is a schematic structural diagram of an electronic apparatus according to some embodiments of the present disclosure.

FIG. 5 is a schematic structural diagram of an electronic apparatus 400 according to some embodiments of the present disclosure. The electronic apparatus 400 may be an apparatus configured to implement the methods described in FIG. 3A to FIG. 4B. As shown in FIG. 5, the electronic apparatus 400 includes a processor 401. The processor 401 can be configured to execute any appropriate steps and processes according to computer program instructions stored in the read-only-memory (ROM) 402 or computer program instructions loaded from the memory 408 to the random-access-memory (RAM) 403. RAM 403 can also store the programs and data required by operations of the apparatus 400. The processor 401, ROM 402, and RAM 403 are connected to each other via a bus 404. An input/output (I/O) interface 405 is also connected to the bus 404.

A plurality of members of the apparatus 400 are connected to the I/O interface 405 and include an input unit 406, such as a keyboard, a mouse, etc., an output unit 407, such as various types of displays, speakers, etc., a memory 408, such as a magnetic disk, an optical disk, etc., and a communication unit 409, such as a network card, a modem, a wireless communication transceiver, etc. The communication unit 409 can be configured to allow the apparatus 400 to exchange information/data with another apparatus through a computer network such as the Internet and/or various telecommunication networks.

The processor 401 can be various general and/or special purpose processing members having processing and computing capabilities. Some examples of the processor 401 can include, but are not limited to, central processing units (CPUs), graphics processing units (GPUs), various specialized artificial intelligence (AI) computing chips, various processors that run machine learning model algorithms, digital signal processing processors (DSP), and any suitable processors, controllers, microcontrollers, etc. The processor 401 can execute various methods and processes described above, for example, the methods 200 and/or the method 200' and/or the method 300 and/or the method 300'. For example, in some embodiments, the method 200 and/or the method 200' and/or the method 300 and/or the method 300' can be implemented as a computer software program stored on a machine-readable medium, such as the memory 408. In some embodiments, a part or all of the computer program can be loaded and/or installed on the apparatus 400 via the ROM 402 and/or the communication unit 409. When the computer program is loaded into the RAM 403 and executed by the processor 401, one or more steps in the method 200 and/or the method 200' and/or the method 300 and/or the method 300' described above can be executed. In some other embodiments, the processor 401 can be configured to perform the one or more steps of the method 200 and/or the method 200' and/or the method 300 and/or the method 300' in any other appropriate manner (for example, by firmware).

The various aspects of the present disclosure are described herein with reference to flowcharts and/or step diagrams of methods, apparatus (systems), and computer program products according to embodiments of the present disclosure. Each step in the flowchart and/or step diagram and a combination of steps in the flowchart and/or step diagram can be implemented by the computer-readable program instructions.

These computer-readable program instructions can be provided to the processor in the voice interaction device, a general-purpose computer, a special-purpose computer, or a processing unit of another programmable data processing device to produce a machine. Thus, when these instructions are performed by the computer or the processing unit of the another programmable data processing device, a device that is configured to implement the defined functions/steps of one or more steps in the flowchart and/or the step diagram can be generated. These computer-readable program instructions can also be stored in the computer-readable storage medium. These instructions can cause the computer, the programmable data processing device and/or another apparatus to work in a specific manner. Thus, the computer-readable medium storing the instructions can include a product, which includes the instructions used to implement the various aspects of the functions/steps defined in one or more steps in the flowchart and/or step diagram.

The computer-readable program instructions can be loaded into the computer, other programmable data processing devices, or other apparatuses to perform a series of operational steps on the computer, other programmable data processing device, or other apparatuses to produce a computer-implemented process. Thus, the instructions defined by the one or more steps in the flowchart and/or step diagrams can be performed on the computer, other programmable data processing devices, or other apparatuses.

The flowcharts and step diagrams in the accompanying drawings show the architecture, functions, and operations that can be possibly implemented for the apparatus, method, and computer program product according to embodiments of the present disclosure. Thus, each step in a flowchart or step diagram can represent a module, a program segment, or a portion of an instruction. The module, the program segment, or the portion of the instruction can contain one or more programmable instructions used to implement the specified logical functions. In some other embodiments, the functions noted in the step can be performed in a sequence different from the sequence noted in the accompanying drawings. For example, two consecutive steps can, in fact, be executed substantially concurrently, or sometimes be executed in the reverse sequence, depending upon the functions involved. Each step in the step diagrams and/or flowcharts and the combination of steps in the step diagrams and/or flowcharts can be implemented by a dedicated hardware-based system that performs the specified functions or actions or by a combination of dedicated hardware and computer instructions.

Figure 8:
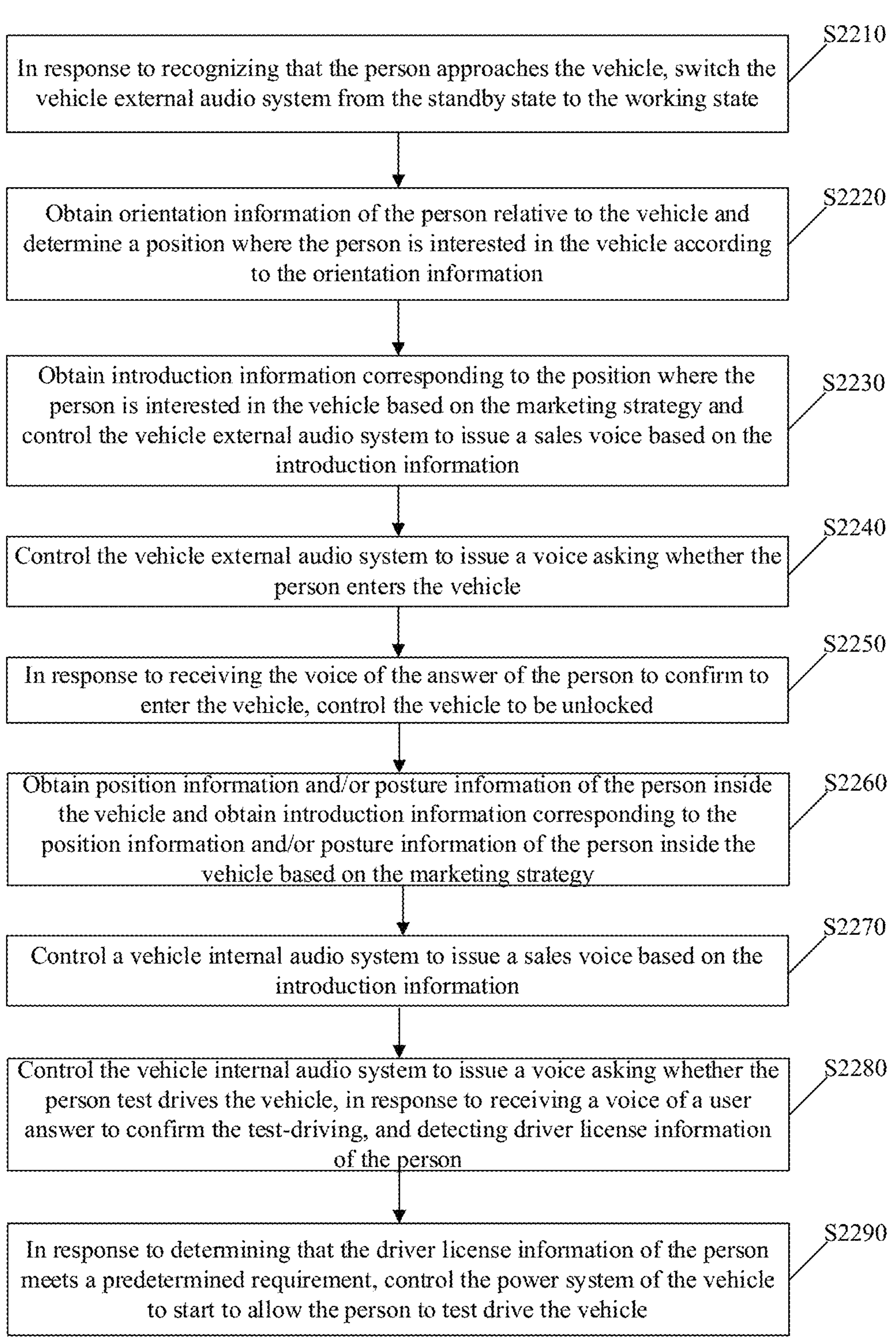
FIG. 8 is a schematic flowchart of another vehicle smart marketing method according to some embodiments of the present disclosure.
Figure 15:
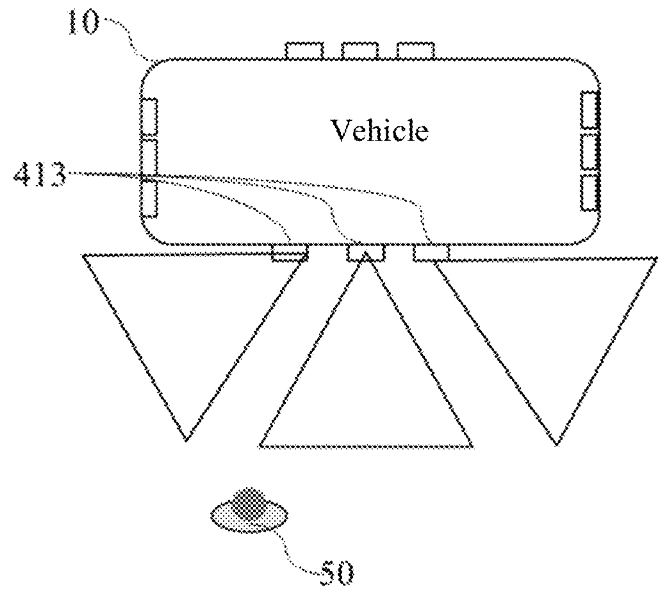
FIG. 15 is a schematic diagram showing positioning and following of a biological sensor according to some embodiments of the present disclosure.
Figure 16:
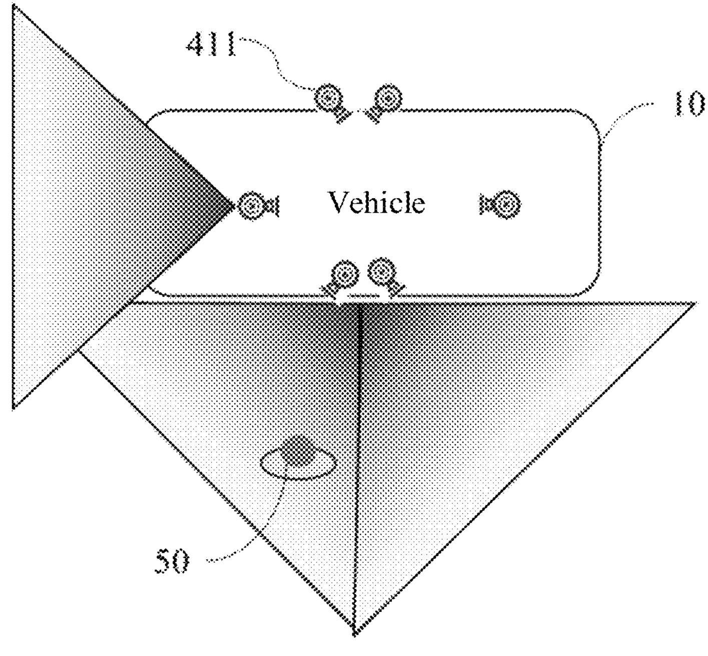
FIG. 16 is a schematic diagram showing image following according to some embodiments of the present disclosure.

In some embodiments, as shown in FIGS. 14 to 16, a vehicle 10 includes, but is not limited to, one or more image sensors (e.g., cameras 411), audio sensors (e.g., microphones 412), biological sensors (e.g., ToF sensors 413), and vibration sensors. The camera can be configured to collect image information from an internal environment or a surrounding environment of the vehicle. In some embodiments, the camera can have an AI recognition function. The audio sensor can be configured to collect sound from the internal environment or the surrounding environment of the vehicle. The biological sensor can be configured to collect biological information from the internal environment or the surrounding environment of the vehicle, e.g., whether a person approaches the vehicle, and a relative positional relationship between the person and the vehicle. The vibration sensor can be configured to sense vibration information of the vehicle. As shown in FIGS. 2 and 8, the vehicle 10 further includes one or more sound members, such as speakers arranged inside and/or outside the vehicle. In some embodiments, a panel sound module can be used for the sound members arranged outside the vehicle.

In some embodiments of the present disclosure, the panel sound module can be a piezoelectric panel sound module. In some embodiments, as shown in FIG. 2, the piezoelectric panel sound module may include a piezoelectric ceramic speaker, which has been described above and is not repeated here.

In some embodiments of the present disclosure, as shown in FIG. 13, the panel sound module is arranged on at least one of a door panel 143, an engine hood 144, a trunk lid 145, a roof cover 148, a chassis 141, a rearview mirror 142, a front bumper 146, or a rear bumper 147.

In some embodiments, the panel sound module can also be an electromagnetic panel sound module or a traditional speaker.

The control system of the vehicle can include the necessary hardware (e.g., a processor, a memory, a storage device) and software (e.g., an operating system, a marketing strategy schedule program, a voiceprint recognition program, a facial recognition program, etc.) to receive voices and/or gestures of a person through sensors, process the received information, and plan a marketing strategy performing a voice interaction with the person.

The above sensors can be configured to sense an instruction issued by the person inside the vehicle during driving, for example, receive a voice instruction from the microphone. In some embodiments, the sensors can be configured to sense the surrounding environment information of the vehicle during the driving process to assist the driver in driving the vehicle. For example, pedestrians around the vehicle can be sensed through the biological sensors on the road.

The vehicle external audio interaction system of the present disclosure can include at least one audio sensor and a sound member.

In some embodiments, a preset marketing strategy can be, for example, a tree structure data, which includes a plurality of leaf nodes. Each of the leaf nodes can be used to describe a standard problem. Each of the leaf nodes can include at least one sub-node, the sub-node can be used to describe a standard answer to the standard question. The control system of the vehicle can be configured to form the standard question according to a response voice of the person, select the standard answer corresponding to the response voice based on the standard question, and then output a voice of the standard answer.

When no person is sensed to approach the vehicle, the vehicle external audio system can be in a standby state. When a person is sensed to approach the vehicle, the vehicle external audio system can switch from the standby state to a working state. The execution object of the above method of the present disclosure can control the vehicle external audio system in the working state to perform voice interaction with the person outside the vehicle based on the predetermined marketing strategy.

When the vehicle can realize the smart marketing function, the vehicle of the present disclosure can be configured to be used in a scene of self-sale, vehicle autonomous product sale, vehicle sharing, item express delivery assistant. Correspondingly, according to different application scenes of the vehicle, a voice sale strategy can include, for example, a self-sale strategy for the vehicle, an item sale strategy for selling an item, a sharing service strategy for sharing the vehicle, and a delivery service strategy for item delivery.

Figure 6:
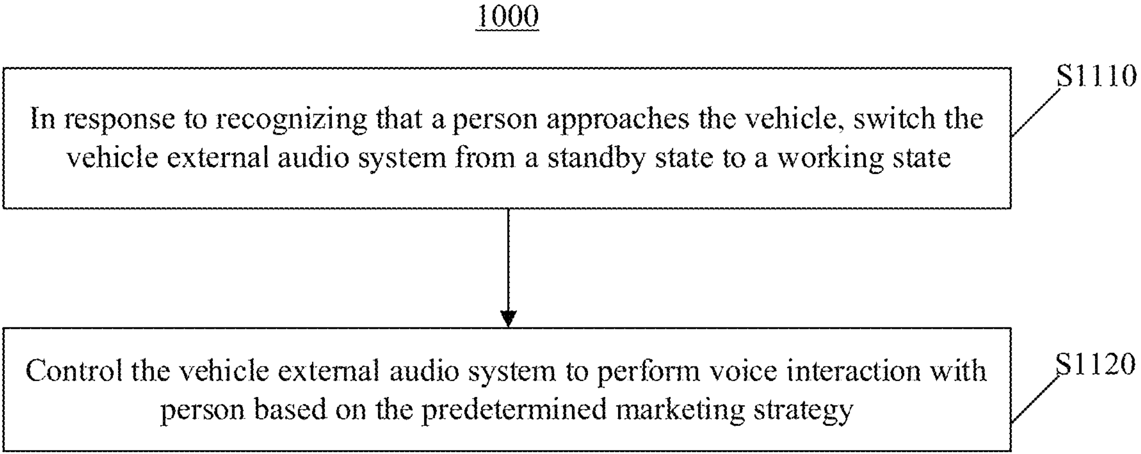
FIG. 6 is a schematic flowchart of a vehicle smart marketing method according to some embodiments of the present disclosure.

As shown in FIG. 6, embodiments of the present disclosure provide a vehicle intelligent marketing method 1000. As shown in FIG. 6, the vehicle intelligent marketing method 1000 includes, in response to recognizing that a person approaches the vehicle, switching the vehicle external audio system from a standby state to a working state (S1110) and controlling the vehicle external audio system to perform voice interaction with a person based on the predetermined marketing strategy (S1120).

The steps shown in the intelligent vehicle marketing method 1000 are not exclusive. Another step can be performed before, after, or between any of the steps shown in FIG. 6. In addition, some steps of the steps described above can be performed simultaneously or can be performed in a sequence different from the sequence shown in FIG. 6. Steps S1110 and S1120 are further described in detail in connection with FIG. 6 and FIG. 7.

In some embodiments, at S1110, in response to recognizing that the person is approaching the vehicle, switching the vehicle external audio system from the standby state to the working state can further include, in response to recognizing that the person is approaching the vehicle, obtaining an identity feature of the person. The identity feature can include at least biological characteristics and/or physical characteristics. At S1120, controlling the vehicle external audio system to perform the voice interaction with the person based on the predetermined marketing strategy can include controlling the vehicle external audio system to emit a sales voice that matches the identity feature with a voice feature that matches the identity feature.

In some embodiments, when the vehicle is in the self-sale scene, people with different identities have different needs for the vehicle. For example, some men can pay more attention to understanding the vehicle power performance and braking performance, for example, the power system such as gasoline, electric, or hybrid, engine or braking system, fuel consumption or battery life, etc. Some women can pay more attention to understanding the brand, appearance, intelligence, cost performance, and interior space of the vehicle. Therefore, when a person is detected to be close to the vehicle, the biological features and/or physical features of the person need to be further obtained. Thus, focus information that attracts the person most can be determined. Then, the targeted sales voice can be emitted to cause the person to be interested in the vehicle to increase the probability of selling the vehicle.

When the vehicle is in the item sale scene, whether the person close to the vehicle is consistent with an applicable object of the sale item can be determined according to the identity feature of the person close to the vehicle. If the person is consistent with the applicable object of the sale item, the vehicle can actively emit the voice to introduce the sale item. If the person is not consistent with the applicable object of the sale item, the person can be ignored. In some embodiments, when the vehicle sells many kinds of products, the vehicle can call introduction information of an item that matches the identity feature of the person based on the sale strategy according to the identity feature of the person and emit the sales voice. After the vehicle external audio system emits the voice, if the vehicle receives voice response information from the person outside the vehicle, the vehicle can further perform the voice interaction with the person outside the vehicle based on the sale strategy according to the voice response information.

In some embodiments, the item sale scene can be applied in a plurality of occasions. For example, when the owner of the vehicle wants to sell an item such as a house or a vehicle, information related to the item to be sold can be recorded in the control system of the vehicle to generate an intelligent sale strategy. For example, asking whether the person outside the vehicle wants to see the house or the vehicle in person can be performed. The introduction information about the house can include the built year of the house, a layout of the house, and school district information corresponding to the house. The vehicle introduction information can include power and appearance of the vehicle. The sale strategy of the vehicle is not limited to selling the vehicle.

In some embodiments, an image or video information of the sale item can be projected onto a road surface or wall through the external camera or projector of the vehicle to attract the attention of the person outside the vehicle.

In some embodiments, the information about the sale item can also be presented to the person outside the vehicle through a screen arranged at the vehicle body.

In addition, for an older person, the voice feature such as the intonation and the speed rate can be adjusted according to a reaction speed and a hearing level of the older person to achieve a relatively good human-machine interaction effect.

Figure 7:
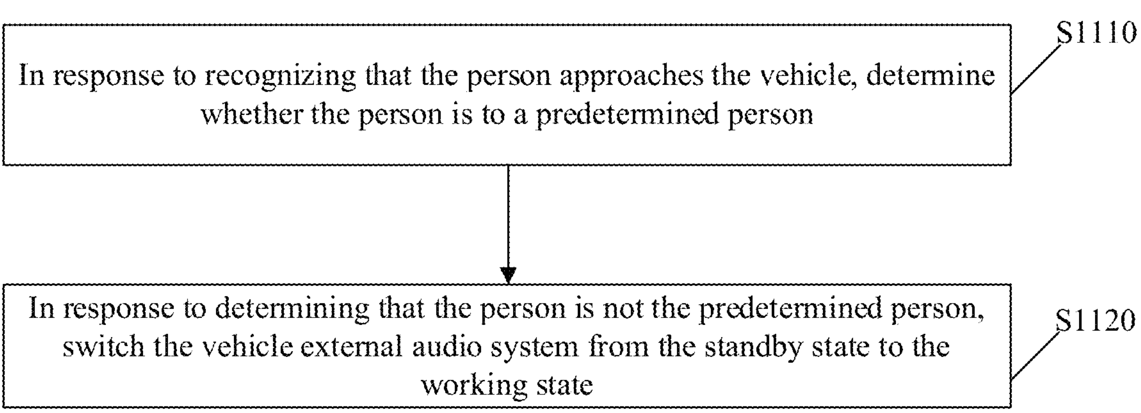
FIG. 7 is a schematic flowchart of switching an operation state of a vehicle external audio interaction system according to some embodiments of the present disclosure.

In some embodiments, as shown in FIG. 7, at S1110, in response to recognizing that the person approaches the vehicle, switching the vehicle external audio system from the standby state to the working state further includes, in response to recognizing that the person approaches the vehicle, determining whether the person is to a predetermined person (S1111) and, in response to determining that the person is not the predetermined person, switching the vehicle external audio system from the standby state to the working state (S1112).

In some embodiments, when the vehicle is in the self-sale scene, the predetermined person can include, for example, a salesperson of the vehicle, a staff of the store, and an owner of the vehicle. When the vehicle is in the item sale scene, the predetermined person can include, for example, the owner of the vehicle. When the vehicle is in the sharing service scene, the predetermined person can include, for example, a maintenance person of the vehicle.

The above solution can avoid false triggering of the vehicle external audio system triggered by the predetermined person approaching the vehicle.

In some embodiments, information such as the voiceprint features and/or facial images of the predetermined person can be pre-stored in the control system. Then, the predetermined person can be excluded from triggering the vehicle external audio system through voiceprint recognition, facial recognition, etc.

In some embodiments, the person that approaches the vehicle can be recognized in at least one of a vehicle external audio wake-up manner, a vehicle external biological sensing manner, a vehicle body vibration sensing manner, or a vehicle external image recognition manner.

In some embodiments, when the vehicle is in the standby state, the vehicle can be woken up by a voice outside the vehicle to activate the vehicle external audio system and the vehicle machine in the cockpit. In some embodiments, the person outside the vehicle can be detected to be next to the vehicle and stay through the biological sensor (e.g., the TOF sensor) outside the vehicle, and the vehicle can actively activate the vehicle external audio system and the vehicle machine in the cockpit. In some embodiments, when the person outside the vehicle knocks on the vibration sensor at an outer side of the vehicle and expects to actively communicate with the vehicle, the vibration sensor can activate the vehicle external audio system and the vehicle machine in the cockpit. In some embodiments, when the vehicle is on, and no person is inside the vehicle, a camera or a 360 camera outside the vehicle can actively detect the person outside the vehicle. After a stranger is recognized, the vehicle external audio system can be notified to switch to the working state and perform voice interaction with the stranger.

The technical solution of the present disclosure is introduced below by taking the self-sale scene of the vehicle as an example.

As shown in FIG. 8, embodiments of the present disclosure provide a vehicle intelligent marketing method 2000. As shown in FIG. 8, the vehicle intelligent marketing method 2000 includes the following processes.

At S2210, in response to recognizing that the person approaches the vehicle, the vehicle external audio system switches from the standby state to the working state.

At S2220, orientation information of the person relative to the vehicle is obtained, and a position where the person is interested in the vehicle is determined according to the orientation information.

At S2230, introduction information corresponding to the position where the person is interested in the vehicle is obtained based on the marketing strategy, and the vehicle external audio system is controlled to emit a sales voice based on the introduction information.

Process S2210 is the same as process S1110 described with reference to FIG. 6 and FIG. 7, which is not repeated here.

In some embodiments, when the person approaches the vehicle and stays around the vehicle, the orientation information of the person relative to the vehicle at the current time can be obtained in process S2220 to determine the position where the person is interested in the vehicle.

For example, when the person is at a rear side of the vehicle, the person can be determined to be interested in a reversing radar of the vehicle. Then, in process S2230, introduction information about the reversing radar can be obtained in the marketing strategy based on the reversing radar. The introduction information about the reversing radar can be emitted through the vehicle external audio system. For another example, when the person is at a front side of the vehicle, the person can be determined to be interested in a power system of the vehicle. Then, in process S2230, the introduction information about the power system can be obtained in the marketing strategy based on the power system, for example, introduction information of an engine or battery life, etc. The introduction information can be emitted through the vehicle external audio system. For another example, when the person is at a position of the rearview mirror of the vehicle, the person can be determined to be interested in whether the rearview mirror of the vehicle can be automatically retracted or whether the vehicle has a function of welcome lights. Thus, in process S2230, introduction information of the function of the rearview mirror can be obtained in the sale strategy based on the rearview mirror. The introduction information can be emitted through the vehicle external audio system.

In some embodiments, at S2220, obtaining the orientation information of the person relative to the vehicle can include obtaining the orientation information of the person relative to the vehicle in a sound field tracking manner, a biological sensor positioning tracking manner, or an image tracking manner.

In some embodiments, as shown in FIG. 14, when the orientation information of the person relative to the vehicle is obtained in the sound field tracking manner, based on a relationship between decibels and distance, a sound pressure level of the person outside the vehicle when speaking can be detected by the microphones 412 outside the vehicle to initially estimate the distances a and b between the microphones 412 and the person 50 outside the vehicle. Since the distances between the plurality of microphones 412 arranged on the exterior body of the vehicle 10 are fixed, e.g., c or d, the person 50 outside the vehicle and the two microphones 412 can roughly form a triangular layout (a, b, and c form a triangle). Then, the current speaking orientation of the person 50 outside the vehicle and the distance of the person 50 to the vehicle 10 can be calculated by using the triangle principle.

When the orientation information of the person relative to the vehicle is obtained in the biological sensor positioning tracking manner, as shown in FIG. 15, the TOF sensor 413 outside the vehicle can be configured to sense the distance and orientation of the person 50. The TOF sensor 413 can be a sensor configured to calculate the distance between an emitter and a reflector by measuring "time of flight" of a signal such as ultrasonic waves, microwaves, and light between the emitter and the reflector. There are many types of TOF sensors 413. The TOF sensor that performs distance measurement through infrared or laser is widely used. In addition, since a detection angle of the TOF sensor 413 is less than 180 degrees, usually 60 degrees or less, a plurality of TOF sensors need to be installed on the outer side of the vehicle 10. The TOF sensor outside the vehicle can be configured to detect the presence of the person 50 outside the vehicle who is less than 10 meters away. When the person 50 outside the vehicle is close to the vehicle, the TOF sensor can detect the movement of the person 50 outside the vehicle, and the orientation and the distance of the person 50 outside the vehicle staying outside the vehicle.

When the orientation information of the person relative to the vehicle is obtained in the image tracking manner, as shown in FIG. 16, the distance and orientation of the person 50 outside the vehicle relative to the vehicle 10 is detected by using the 360 camera or the camera 411 outside the vehicle. In addition, a body posture of the person 50 outside the vehicle can be recognized using the camera 360 outside the vehicle, such as a finger pointing direction, a head orientation, etc.

In some embodiments, as shown in FIG. 9, process S2230 also includes determining whether the person has an emotional change for the sales voice (S2231) and, in response to the change in the emotion of the person, adjusting the sales voice emitted by the vehicle external audio system according to the change the emotional change of the person (S2232).

Adjusting the sales voice emitted by the vehicle external audio system according to the emotional feedback of the person can improve the effectiveness of the human-machine interaction.

In some embodiments, when the vehicle external audio system performs the voice interaction with the person, whether the person has the emotional change for the sales voice can be determined by detecting the information that can reflect the emotion of the person such as the facial expression, the voice feature, and the gesture feature of the person. The emotional change information can include but is not limited to a positive direction fluctuation, a negative direction fluctuation, and a smooth fluctuation. The positive direction fluctuation can be a positive fluctuation, which indicates that the person gradually satisfies the information about the vehicle introduced by the sales voice at the current time, and the person can have a good experience. The negative direction fluctuation can be a negative fluctuation, which indicates that the person is gradually disappointed with the information about the vehicle introduced by the sales voice at the current time, and the person can have a poor experience. The smooth fluctuation can be a normal fluctuation, which indicates that the person does not satisfy with or is disappointed with the information about the vehicle introduced by the sales voice at the current time, and the person can have a neutral attitude.

In some embodiments, a recognition result of a facial expression feature, a voice feature, and a gesture may include "joyful," "excited," "angry," "sad," "surprised," and "disappointed." According to general habits, "joyful," "excited," and "surprised" can represent positive emotions, while "angry," "sad," and "disappointed" can represent negative emotions.

In some embodiments, in response to the change in the emotion of the person, adjusting the sales voice emitted by the vehicle external audio system according to the emotional changes of the person can include, in response to detecting a positive direction emotional change of the person, obtaining a target voice content corresponding to the positive direction emotional change in the sales voice emitted by the vehicle external audio system, obtaining the introduction information corresponding to the target voice content based on the marketing strategy, and controlling the vehicle external audio system to emit the sales voice based on the introduction information.

In some embodiments, when the emotional change of the person is determined to be the positive direction emotional change for the sales voice, the person can be substantially determined to be satisfied with the content of the sales voice. Then, the target voice content corresponding to the positive emotional change in the sales voice emitted by the vehicle external audio system can be determined according to the time node of the emotional change. Thus, the person needs can be accurately analyzed, and the vehicle introduction can be effectively performed to improve the "stickiness" of the vehicle to the customer, which is helpful to develop the person as a candidate customer to increase the sale results.

In some embodiments, at S2230, after controlling the vehicle external audio system to perform voice interaction with the person based on the predetermined marketing strategy, as shown in FIG. 8, the vehicle intelligent marketing method 2000 further includes controlling the vehicle external audio system to emit a voice asking whether the person enters the vehicle (S2240) and, in response to receiving the voice of the answer of the person to confirm to enter the vehicle, controlling the vehicle to be unlocked (S2250).

In some embodiments, the vehicle cockpit has become a place to compete in the vehicle industry. The main reason can be driven by consumer demand and changes in the vehicle purchase decision.

Firstly, the customer can have upgraded requirements for the cockpit. With the development of vehicle networking, since the cockpit can directly affect customer drive experience, the customer can require more intelligent cockpit experience, e.g., navigation, social, and entertainment, in addition to "safety" and "comfort." These convenient and humanized services are expected to solve the driving needs. Secondly, the customer needs a more humanized "third space." Currently, the most common life status can include going to and coming back between work and home. If home and company are a first space and a second space in people life. The cockpit can be the third space in people life. Compared with the first space and the second space, the cockpit can be mobile and more standardized and can be suitable as a private living space. Person satisfaction can be increased with a good cockpit. Then, the customer has already considered the cockpit as a key factor of buying the vehicle. According to the newest investigation, the intelligent technology configuration of the cockpit has become a second key element after the safety configuration. The importance of the intelligent technology configuration of the cockpit has exceeded the importance of a traditional vehicle buying element, such as power, space, and price. Especially, for young people with an age between 25 and 35 years old, 51% of the young people consider an intelligent level of the cockpit as an important reference factor for buying the vehicle. Even 28% of the people consider the intelligent level of the cockpit as the first reference factor for buying the vehicle. As the vehicle industry converts from a sale market to a buying market, the right to speak of the person is being increased. A mode of user-driven product design and user-defined intelligent cockpit experience can become mainstream.

Therefore, after introducing information such as the performance or appearance of the vehicle, the vehicle external audio system can be controlled to emit an invitation voice asking whether the customer enters the vehicle for experience. After receiving the voice of the person to confirm to enter the vehicle, the door of the vehicle can be controlled to be unlocked. Thus, the person can enter the vehicle to further understand the configuration information in the cockpit of the vehicle immersively.

In some embodiments, to improve safety performance, after receiving the voice of the person to confirm the person to enter the vehicle, the salesman of the vehicle can be notified, and the salesman of the vehicle can unlock the door. In some other embodiments, the person can obtain the right to enter the vehicle after the information is input by scanning a 2-dimension code provided by the vehicle. When the information input by the person is received, the safety of the input information can be ensured by using an open privacy algorithm such as a federated learning algorithm.

In some embodiments, as shown in FIG. 8, at S2250, after controlling the vehicle door to unlock, the vehicle intelligent marketing method 2000 further includes obtaining position information and/or posture information of the person inside the vehicle, obtaining introduction information corresponding to the position information and/or posture information of the person inside the vehicle based on the marketing strategy (S22260), and controlling a vehicle internal audio system to emit a sales voice based on the introduction information (S2270).

In some embodiments, in process S2260, the camera in the vehicle can be configured to detect the position, head posture, and eye gaze direction of the person in the vehicle to determine an interior member that the person pays attention to.

In some embodiments, when the person is seated in the driving seat, an introduction can be made to a process of intelligent driving, for example, head-up display (AR-HUD), central control system, etc. When the person is seated in a rear seat, an introduction can be made on information about the size of the rear space, the air-conditioning outlets of the rear seats, and the charging ports of the rear seats.

The vehicle internal audio system of the present disclosure includes at least one audio sensor and a sound member.

During a process of test driving, the person can sufficiently understand the driving performance and handling performance of the vehicle. Therefore, in some embodiments, as shown in FIG. 8, to improve the probability of the person buying the vehicle, the vehicle intelligent marketing method 2000 further includes controlling the vehicle internal audio system to emit out a voice asking whether the person test drives the vehicle, in response to receiving a voice of the person to confirm the test-driving, and detecting driver license information of the person (S2280), and in response to determining that the driver license information of the person meets a predetermined requirement, controlling the power system of the vehicle to start to allow the person to test drive the vehicle (S2290).

In the above solution, by confirming that the driver license information of the test driver meets the predetermined requirement, the safety of the test driving process can be guaranteed.

In addition, test driving steps can be preset in the vehicle control system. For example, firstly, a display of the vehicle can be configured to show members that need to be operated during driving the vehicle to the test driver, such as specific operations of control buttons of rearview mirrors, wipers, lights, audio, air conditioners, and seats, and gear positions. Thus, the test driver can be familiar with the positions of the members and operation processes. Secondly, a predetermined test driving route can be set for the test driving process. During the test driving process, the vehicle can only be tested according to the predetermined test driving route. If the vehicle is off from the test driving route, a warning message can be issued, and the power system can be controlled to stop. In some embodiments, a plurality of test driving routes can be predetermined in the vehicle control system for selection.

In some other embodiments, the vehicle intelligent marketing method 2000 can also include controlling the vehicle internal audio system to emit a voice asking whether the person test drives the vehicle, in response to receiving a voice of a person to confirm the test driving, and sending out information to invite an accompanying driver of the vehicle to accompany the test driver (S2280'), and in response to determining that the accompanying driver enters the vehicle, controlling the power system of the vehicle to start to allow the person to test drive the vehicle (S2290').

In the above solution, the person can test drive the vehicle with the professional accompanying driver. Thus, the safety during the test driving can be further improved. Meanwhile, with face-to-face interaction between the test driver and the accompanying driver, buying intention of the person can be further understood.

As shown in FIG. 10, embodiments of the present disclosure provide a vehicle intelligent marketing method 3000. As shown in FIG. 10, the vehicle intelligent marketing method 3000 includes the following processes.

At S3310, in response to recognizing that a person approaches the vehicle, the vehicle external audio system is switched from a standby state to a working state.

At S3320, human body posture information of the person is obtained to determine the position where the person is interested in the vehicle according to the posture information.

At S3330, introduction information corresponding to the position where the person is interested in the vehicle is obtained based on the marketing strategy, and the vehicle external audio system is controlled to emit a sales voice based on the introduction information.

Process S3310 is the same as processes S1110 and S2210 as shown in FIG. 1, FIG. 2, and FIG. 3, which are not repeated here.

In some embodiments, the human posture information in process S3320 can include a pointing direction of the fingers, an orientation of the head, etc. The position where the person is interested in the vehicle can be determined through the posture information. For example, the person can use a finger to point to the position of the top of the vehicle. The vehicle can substantially determine that the person is interested in a sunroof of the vehicle. Thus, the vehicle can obtain introduction information about the sunroof in the marketing strategy based on the sunroof, for example, how the sunroof is opened, the material of the sunroof glasses, and maintenance of the sunroof. In process S3330, the introduction information can be emitted through the vehicle external audio system.

In some embodiments, the human posture information can be recognized mainly through recognition based on computer vision and recognition based on motion capture technology. For the recognition based on the computer vision, the human posture can be recognized through feature information, such as a video image sequence, a human body contour, and multi-view angles. For the recognition based on the motion capture technology, a human body movement trajectory can be recognized by positioning joint points of the human body and storing joint point movement data information. The method of obtaining the human posture information of the person can be obtained by those skilled in the art under the teaching of the present disclosure, which is not repeated here.

The method 3000 also includes processes S2240 to S2290 (S2290') as shown in FIG. 3 and FIG. 4, which are not repeated here.

The technical solution of the present disclosure is introduced below by taking the sharing service scene of the vehicle as an example.

The sharing service scene of the vehicle can include the sharing service scene of the shared vehicle and the delivery service scene of item delivery through the shared vehicle.

As shown in FIG. 6, embodiments of the present disclosure provide a vehicle intelligent marketing method 4000. The vehicle can be in a sharing operation type. For example, a sign "voice shared vehicle" and a guidance sign showing how to use the vehicle can also be pasted on the vehicle body. In some embodiments, if the vehicle has the autonomous driving capability, a sign of "autonomous drive" can also be pasted on the vehicle body. Thus, a person who cannot drive a vehicle can notice the vehicle.

Figure 11:
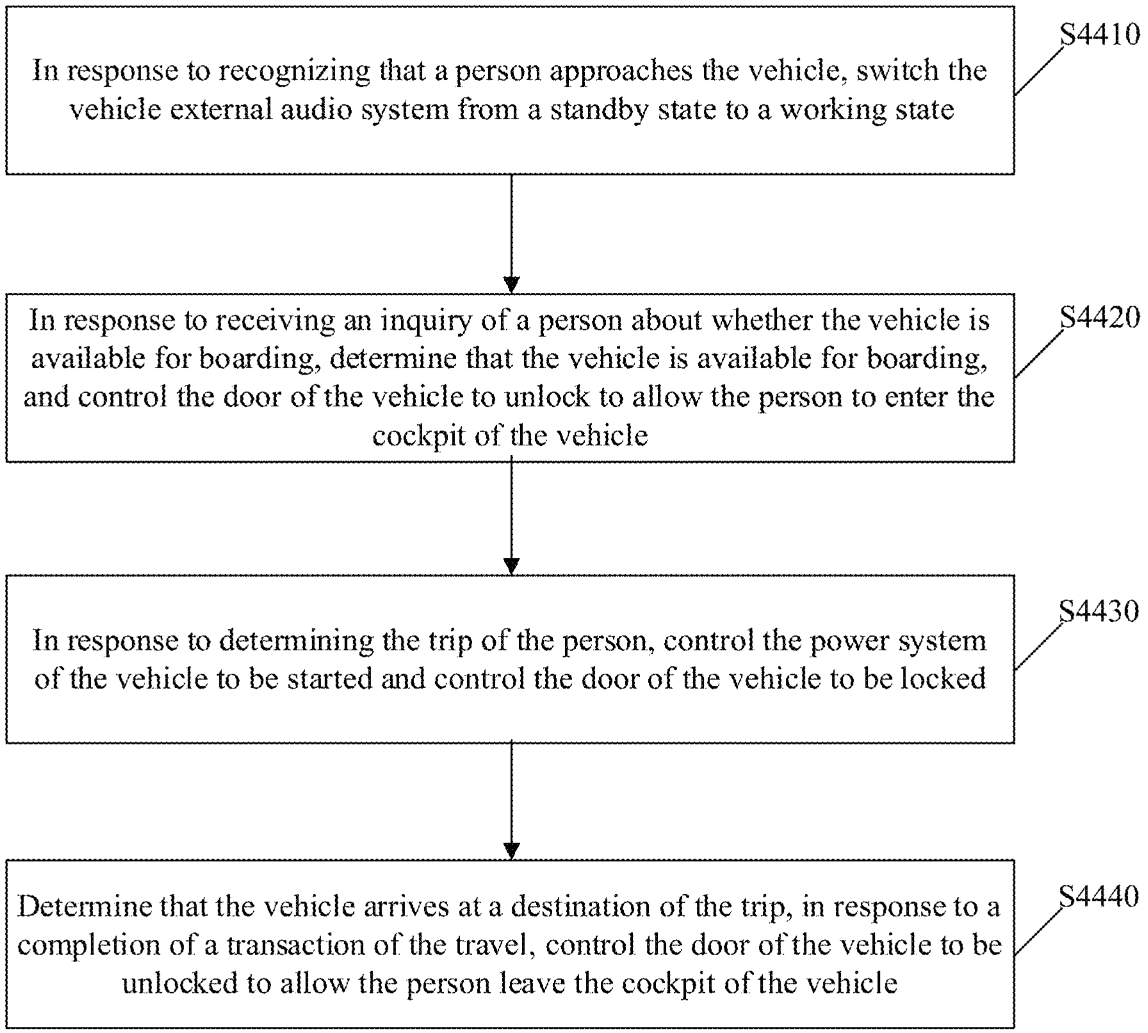
FIG. 11 is a schematic flowchart of another vehicle smart marketing method according to some embodiments of the present disclosure.

As shown in FIG. 11, the vehicle intelligent marketing method 4000 includes the following processes.

At S4410, in response to recognizing that a person approaches the vehicle, the vehicle external audio system is switched from a standby state to a working state.

At S4420, in response to receiving an inquiry from a person about whether the vehicle is available for boarding, the vehicle is determined to be available for boarding, and the door of the vehicle is controlled to unlock to allow the person to enter the cockpit of the vehicle.

At S4430, in response to determining the trip of the person, the power system of the vehicle is controlled to be started, and the door of the vehicle is controlled to be locked.

At S4440, the vehicle is determined to arrive at a destination of the trip, in response to a completion of a transaction of the trip, the door of the vehicle is controlled to be unlocked to allow the person to leave the cockpit of the vehicle.

In some embodiments, in this scene, the vehicle can be parked in a parking lot. In process S4410, for example, after the audio sensor arranged outside the vehicle receives the voice of the person outside the vehicle asking whether the vehicle is available for boarding, the vehicle external audio system can switch from the standby state to the working state. In some other embodiments, when the person outside the vehicle knocks on the window, and the vibration sensor of the vehicle senses the vibration, the vehicle external audio system can switch from the standby state to the working state. In some other embodiments, when the camera arranged outside the vehicle captures that someone near the vehicle is waving hands for a taxi, the vehicle external audio system can be controlled to switch from the standby state to the working state, and a voice of "Do you want to take a taxi?" can be emitted.

In process S4420, if an inquiry voice from the person outside the vehicle has been received, when the vehicle control system determines that the current state of the vehicle is an idle state, the vehicle control system can control the door of the vehicle to be unlocked and control the vehicle external audio system to issue a voice of "vehicle is available, the door is unlocked, welcome aboard." If the person outside the vehicle causes the vehicle external audio system to switch from the standby state to the working state by knocking on the window, the vehicle external audio system can issue a voice of "Do you want to take the vehicle?" After receiving the voice of the person to confirm boarding the vehicle, when the vehicle control system determines that the current state of the vehicle is idle, the vehicle control system can control the door of the vehicle to be unlocked and control the vehicle external audio system to issue the voice of "vehicle is available, the door is unlocked, welcome aboard.".

After the person enters the cockpit of the vehicle, in process S4430, the vehicle internal audio system can be controlled to issue a voice of "Please confirm the trip," and a guidance voice of "You can determine the trip by the following methods." Determining the trip can include determining a destination, a driving route, and whether remaining gasoline or electricity can meet the trip need. If the gasoline is insufficient, a voice of "the gasoline/battery is insufficient, but a gas station/charging station/exchanging station can be found in the trip route, please confirm whether to continue." After the trip is determined, the vehicle power system can be controlled to be started and the doors of the vehicle to be locked. Then, a prompt voice of "please fasten your seat belt" can also be issued. When the destination of the trip exceeds an operating range of the vehicle, a voice of "The destination is beyond the operating range of the vehicle. A dispatch fee of XX yuan will be charged. Please confirm whether to continue."

If the vehicle is an autonomous driving vehicle, then in process S440, after driving to the destination according to the determined trip, a voice of "arrived near the destination, please confirm whether to change a destination" can be issued. After a voice of the person confirming that the destination is not changed is received from the passenger, a voice "please make a payment" can be issued, and then, a voice of "you can pay by scanning the code or by scanning your face, please choose." After confirming that the passenger has selected the payment method, a QR code used for charging can be displayed on the display of the vehicle or the camera can be turned on to allow the passenger to pay by scanning his face. In response to the completion of the transaction of the trip, that is, after the passenger successfully makes the payment, the doors of the vehicle can be controlled to be unlocked to allow the passenger to leave the vehicle. In some embodiments, whether the vehicle is parked in a parking space through can be determined by a camera arranged outside the vehicle. If the vehicle is not parked in the parking space, a voice of "Please park the vehicle in the parking space" can also be issued. In some embodiments, a prompt voice of "Please take your belongings with you" and other farewell words similar to "Have a nice trip" can also be issued. In some other embodiments, when the passenger gets off the vehicle, and an item left by the passenger is determined by the camera arranged in the vehicle, a voice of "You have items left in the vehicle, please take them with you" can be issued by the vehicle external audio system.

If the vehicle does not have the autonomous driving ability, in process S4430, a voice of "Please show your driver license" can be issued. When determining that the passenger has the driving ability, the vehicle control system can control the power system of the vehicle to be started and the door of the vehicle to be locked. In some embodiments, voice navigation of the vehicle internal audio system can also be used to ask the passenger to be familiar with the positions and usage methods of the members for driving the vehicle. Thus, the passenger can drive the vehicle smoothly.

In some embodiments, during the driving process of the passenger, the vehicle internal audio system can also issue a voice of "whether to turn on the traffic radio/music/talk show" to improve the experience of the passenger.

The sequence of process S4420 and process S4430 can be exchanged. That is, the door can be controlled to be unlocked after completing the process of determining the trip outside the vehicle.

In some embodiments, in process S4420, when the vehicle is determined to be in a reserved state, a voice of "I'm sorry, the vehicle has been reserved" can be issued. Further, whether a shared vehicle that is available nearby can be determined through an operating system of the shared vehicle. If the shared vehicle that is available nearby is determined, a voice of "There is a shared vehicle that is available at XXXXX at XXX meters away from you. You can go to use it" can be issued.

The above solution provides a brand-new operation mode for the shared vehicles, which is easy to operate, and can also solve the current problem that people need to download an app for operating the shared vehicles before the people use the shared vehicles.

Figure 12:
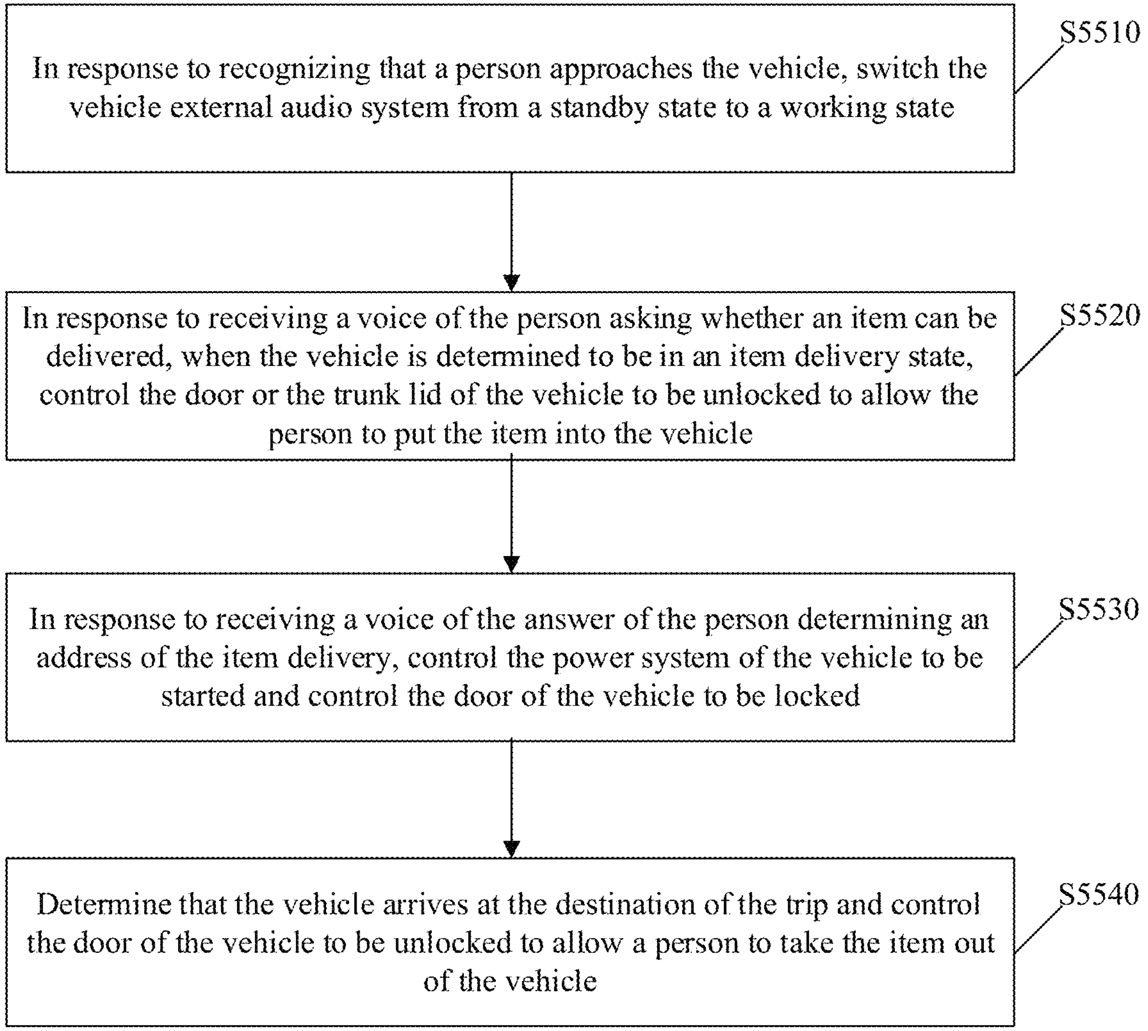
FIG. 12 is a schematic flowchart of another vehicle smart marketing method according to some embodiments of the present disclosure.

As shown in FIG. 12, embodiments of the present disclosure provide a vehicle intelligent marketing method 5000. The vehicle can be in the shared operation type. For example, a sign such as "voice-based item delivery autonomous driving vehicle" and a guidance sign showing how to use can be pasted on the vehicle body.

As shown in FIG. 12, the vehicle intelligent marketing method 5000 includes the following processes.

At S5510, in response to recognizing that a person approaches the vehicle, the vehicle external audio system is switched from a standby state to a working state.

At S5520, in response to receiving a voice of the person asking whether an item can be delivered, when the vehicle is determined to be in an item delivery state, the door or the trunk lid of the vehicle is controlled to be unlocked to allow the person to put the item into the vehicle.

At S5530, in response to receiving the voice of the person determining the address of the item delivery, the power system of the vehicle is controlled to be started, and the door of the vehicle is controlled to be locked.

At S5540, the vehicle is determined to arrive at the destination of the trip, and the door of the vehicle is controlled to be unlocked to allow a person to take the item out of the vehicle.

In some embodiments, in this scene, the vehicle is parked in a parking space. In process S5510, for example, after the audio sensor arranged outside the vehicle receives a voice from the person outside the vehicle asking whether the item can be delivered, the vehicle external audio system can switch from the standby state to the working state. In some other embodiments, when the person outside the vehicle knocks on the window, and the vibration sensor of the vehicle senses the vibration, the vehicle external audio system can switch from the standby state to the working state.

In process S5520, if the inquiry voice from the person outside the vehicle is received, when the control system of the vehicle determines that the current state of the vehicle is an idle state, the control system can control the door of the vehicle to be unlocked and control the vehicle external audio system to issue a voice of "vehicle is available, what item do you want to deliver?" After a voice of the person outside the vehicle answering what kind of item it is, the control system can also control the vehicle external audio system to issue a voice of "Please place the item at XXX" and control the camera outside the vehicle to start. When the item is determined to be a non-prohibited item through image recognition, a voice of "The door is unlocked, please put the items in the vehicle" can be issued. A size of the item can also be determined when the item is determined through the image recognition. Thus, the control system can correspondingly control the door of the vehicle of the trunk lid to be unlocked. Then, if the person outside the vehicle causes the vehicle external audio system to switch from the standby state to the working state by knocking on the window of the vehicle, the vehicle external audio system can also issue a voice of "do you want to send an item." After receiving a voice of the person to confirm the item delivery, when the current state of the vehicle is determined to be in the idle state, the control system can control the vehicle to automatically control the door of the vehicle or the trunk lid of the vehicle to be unlocked after determining the type of the item and the size of the item satisfying the requirement.

After the item is put into the vehicle, in process S5530, the vehicle external audio system can be controlled to issue a voice of "Please confirm the trip." Determining the trip can include determining the destination, the driving route, and whether the remaining gasoline or battery satisfies the trip. If gasoline is insufficient, a voice of "the gasoline/battery is insufficient, but a gas station/charging station/exchanging station can be found in the driving route, please confirm whether to continue." After the trip is determined, the power system can be controlled to be started, and the door of the vehicle can be controlled to be locked. When the destination of the trip exceeds an operating range of the vehicle, a voice of "The destination is beyond the operating range of the vehicle. A dispatch fee of XX yuan will be charged. Please confirm whether to continue." After the trip is confirmed, a voice of "please specify the information of the person to receive the item" can also be issued. Thus, the recipient can be contacted after the vehicle arrives at the destination. According to relevant regulations, the person who sent the item needs to be authenticated by a voice prompt. When the information of the sender and the recipient is involved, an open privacy algorithm such as a federated learning algorithm can be used in the present disclosure to protect the safety of the personal information.

After the trip is determined, a cost of delivering the item can be calculated according to a distance of the trip and a size of the item, etc., and a voice of "Please make a payment of XX yuan" can be issued. Then, a voice of "You can scan the code or scan your face to make the payment, please choose" can be issued. After determining the payment method selected by the person who sends the item, a QR code for payment can be displayed on the window of the vehicle, or the camera outside the vehicle can be turned on to allow the person who sent the item to make the payment by scanning his face.

After determining the trip or receiving the payment confirmation, in process S5540, after automatically driving to the destination according to the determined trip, the control system of the vehicle can control a communication module of the vehicle to contact the recipient and send out a voice of "You have an item to receive, please go to XXX to receive." When the recipient arrives near the vehicle, through the voice interaction with the recipient outside the vehicle, the control system can determine the identity of the recipient and control the door or the trunk lid of the vehicle to be unlocked to allow the recipient to take the item out of the vehicle.

In addition, when the recipient receives the item, the camera outside the vehicle can also record the process of receiving the item, and the recipient can be asked to verify the item.

In process S5530, the fee required for sending the item can also be settled by the recipient after the item is delivered in process S5540.

In some embodiments, in process S5520, when the vehicle is determined to be in the reserved state, a voice of "I'm sorry, the vehicle has been reserved" can be issued. Further, whether a shared vehicle that is available nearby can be determined through the operation system of the shared vehicle. If a shared vehicle is determined to be available nearby, a voice of "There is a shared vehicle that is available at XXXXX at XXX meters away from you. You can go to use" can be issued.

In addition, based on the above vehicle intelligent marketing method, embodiments of the present disclosure further provide an electronic apparatus, such as a server, a cloud server, etc.

Figure 17:
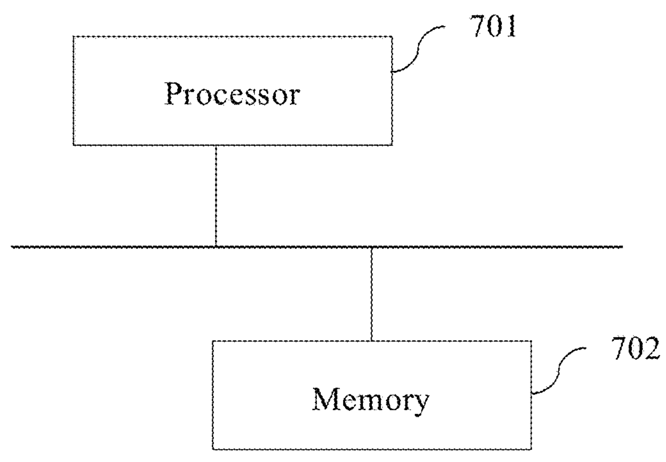
FIG. 17 is a schematic structural diagram of an electronic apparatus according to some embodiments of the present disclosure.

FIG. 17 is a schematic structural diagram of the electronic apparatus according to some embodiments of the present disclosure.

As shown in FIG. 12, the electronic apparatus includes at least one processor 701 and a memory 702 communicatively connected to at least one processor 701. The memory 702 can store instructions executable by the at least one processor 701 that, when the instructions are processed by the at least one processor 701, cause the at least one processor 701 to execute the vehicle intelligent marketing methods of embodiments of the present disclosure. The electronic apparatus can include various forms of digital computers, such as laptops, desktops, workstations, personal digital assistants, servers, blade servers, mainframes, and other suitable computers. The electronic apparatus can also include various forms of mobile devices, such as personal digital processing, cellular telephones, smartphones, and other similar computing devices. The members, the connections and relationships of the members, and the functions of the members are illustrated as examples in the specification, which are not intended to limit embodiments of the present disclosure.

Figure 18:
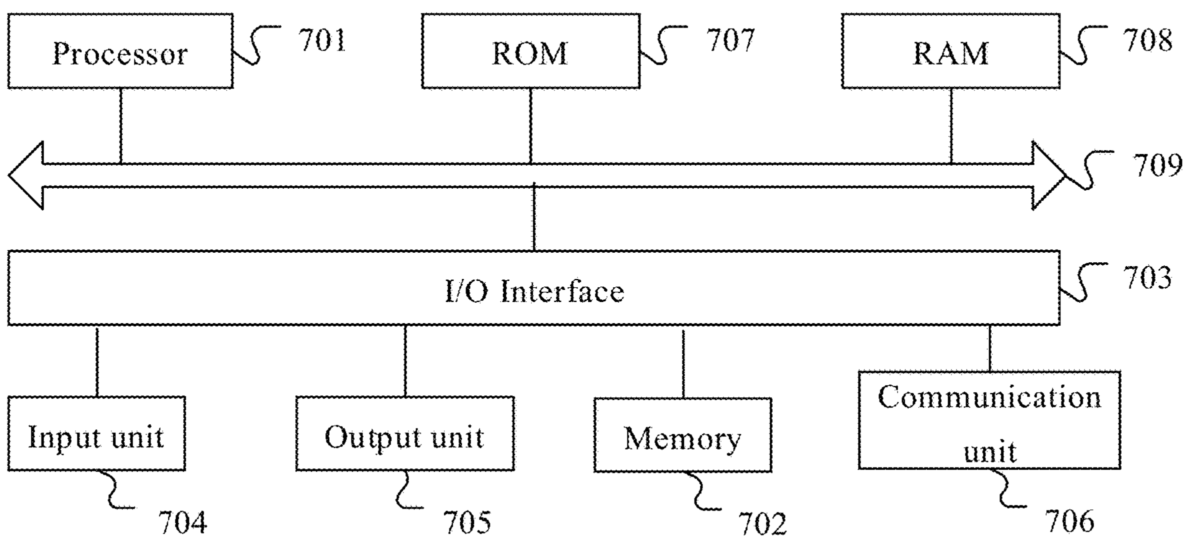
FIG. 18 is a schematic structural diagram of an electronic apparatus according to some embodiments of the present disclosure.

FIG. 18 is a schematic structural diagram of the electronic apparatus according to some embodiments of the present disclosure.

As shown in FIG. 18, the electronic apparatus further includes, for example, an I/O interface 703, an input unit 704, an output unit 705, a communication unit 706, a read-only memory (ROM) 707, and a random access memory (RAM) 708. In some embodiments, the processor 701 can be configured to execute any appropriate steps and processes according to computer program instructions stored in the ROM 707 or computer program instructions loaded from the memory 702 to the RAM 708. The RAM 708 can also store the programs and data required by operations of the apparatus. The processor 701, ROM 707, and RAM 708 are connected to each other via a bus 709. An input/output (I/O) interface 703 is also connected to the bus 709.

A plurality of members of the apparatus are connected to the I/O interface 703 and include an input unit 704, such as a keyboard, a mouse, etc., an output unit 705, such as various types of displays, speakers, etc., a memory 702, such as a magnetic disk, an optical disk, etc., and a communication unit 706, such as a network card, a modem, a wireless communication transceiver, etc. The communication unit 706 can be configured to allow the apparatus to exchange information/data with another apparatus through a computer network such as the Internet and/or various telecommunication networks.

The processor 701 can be various general and/or special purpose processing members having processing and computing capabilities. Some examples of the processor 401 can include, but are not limited to, central processing units (CPUs), graphics processing units (GPUs), various specialized artificial intelligence (AI) computing chips, various processors that run machine learning model algorithms, digital signal processing processors (DSP), and any suitable processors, controllers, microcontrollers, etc. The processor 701 can execute various methods and processes described above, for example, the vehicle intelligent marketing methods. For example, in some embodiments, the vehicle intelligent marketing methods can be implemented as a computer software program stored on a machine-readable medium, such as the memory 702. In some embodiments, a part or all of the computer program can be loaded and/or installed on the apparatus via the ROM 707 and/or the communication unit 706. When the computer program is loaded into the RAM 708 and executed by the processor 701, one or more steps in the vehicle intelligent marketing methods described above can be executed. In some other embodiments, the processor 701 can be configured to perform the one or more steps of the vehicle intelligent marketing methods in any other appropriate manner (for example, by firmware).

Various implementations of the systems and techniques described above herein can be implemented in a digital electronic circuit system, an integrated circuit system, a field programmable gate array (FPGA), an application specific integrated circuit (ASIC), an application specific standard product (ASSP), a system-on-chip system (SOC), a complex programmable logic device (CPLD), computer hardware, firmware, software, and/or a combination thereof. These embodiments can be implemented in one or more computer programs. The one or more computer programs can be executed and/or interpreted on a programmable system including at least one programmable processor. The programmable processor can include a special-purpose or general-purpose programmable processor, which can receive data and instruction from a storage system, at least one input device, and at least one output device and transmit data and instruction to the storage system, the at least one input device, and the at least one output device.

Program codes for implementing the methods of the present disclosure can be written in any combination of one or more programming languages. The above program codes can be packaged into a computer program product. These program codes or computer program products can be provided to a processor or controller of a general-purpose computer, a special-purpose computer, or another programmable data processing apparatus. Thus, when the program codes is executed by the processor 701, the defined functions/operations in the flowchart and/or block diagram can be implemented. The program codes can be executed entirely on the computer, partially on the computer, as a stand-alone software package partially on the computer and partially on a remote computer, or entirely on the remote computer or server.

For the specific description and beneficial effects of the electronic apparatus, reference can be made to the description of the vehicle intelligent marketing methods, which are not repeated here.

In addition, embodiments of the present disclosure further provide a computer-readable storage medium. The computer-readable storage medium can be a tangible device that can hold and store instructions used by the instruction execution apparatus. A computer-readable storage medium can be, for example, but is not limited to, an electrical storage apparatus, a magnetic storage apparatus, an optical storage apparatus, an electromagnetic storage apparatus, a semiconductor storage apparatus, or any suitable combination thereof. More specific examples (non-exhaustive list) of computer-readable storage medium can include portable computer disks, hard disks, random access memory (RAM), read-only memory (ROM), erasable programmable read-only memory (EPROM or flash memory), static random access memory (SRAM), portable compact disk read-only memory (CD-ROM), digital versatile disk (DVD), memory sticks, floppy disks, mechanically coded devices, such as a print hole card or a protrusion structure in a groove storing the instructions, and any combination thereof. The computer-readable storage medium of the present specification cannot be interpreted as an instantaneous signal, such as radio waves or other freely propagating electromagnetic waves, electromagnetic waves propagating through waveguides or other transmission media (for example, light pulses through fiber optic cables), or electrical signals transmitted by wires.

The computer-readable program instructions described herein can be downloaded from a computer-readable storage medium to the computing/processing apparatuses or downloaded to an external computer or external storage apparatus through a network, such as the Internet, a local area network, a wide area network, and/or a wireless network. The network can include copper transmission cables, fiber optic transmission, wireless transmission, routers, firewalls, switches, gateway computers, and/or edge servers. A network adapter card or a network interface in each computing/processing apparatus can receive computer-readable program instructions from the network and forward the computer-readable program instructions to be stored in the computer-readable storage medium in each computing/processing apparatus.

The computer program instructions used to perform the operations of the present disclosure can be assembly instructions, instruction set architecture (ISA) instructions, machine instructions, machine-related instructions, microcode, firmware instructions, state setting data, or source codes or object codes written in any combination of one or more programming languages. The programming languages can include object-oriented programming languages—such as Smalltalk, C++, etc., and conventional procedural programming languages—such as C or similar programming languages. The computer-readable program instructions can be executed entirely on the personal computer, partially on the personal computer, as a stand-alone software package, partially on the personal computer and partially on a remote computer, or entirely on the remote computer or server. When the remote computer is involved, the remote computer can be connected to the personal computer through any kind of network, including a local area network (LAN) or a wide area network (WAN), or can be connected to an external computer (e.g., through the Internet of an Internet service provider). In some embodiments, electronic circuits, such as programmable logic circuits, a field programmable gate array (FPGA), or a programmable logic array (PLA), can be customized by using state information of computer readable program instructions. The electronic circuits can be configured to execute the computer-readable program instructions to implement the various aspects of the present disclosure.

The above description is merely exemplary embodiment of the present disclosure and an illustration of the applied technical principle. Those skilled in the art should understand that the protection scope involved in the present disclosure is not limited to the technical solutions formed by the specific combination of the above-mentioned technical features, but also covers other technical solutions made of the above-mentioned technical features or equivalent features without departing from the technical concept. For example, a technical solution can be formed by replacing the above features with technical features with similar functions disclosed in the present disclosure (but not limited to).

What is claimed is:

1. A vehicle intelligent marketing method implemented by a controller of the vehicle, the method comprising:

receiving signals from one or more sensors and recognizing that a person is approaching a vehicle by calculating a distance between an emitter and a reflector by measuring time of flight (TOF) signals;

in response to recognizing that the person is approaching the vehicle, switching a vehicle external audio system from a standby state to a working state including in response to recognizing that the person approached the vehicle, obtaining an identity feature of the person, the identity feature including at least biological features and/or physical features using at least one of a TOF senor, a vibration sensor, or an image sensor outside the vehicle; and controlling the vehicle external audio system to perform voice interaction with the person based on a predetermined marketing strategy, including controlling the vehicle external audio system to emit a sales voice matching the identity feature with a voice feature matching the identity feature, including matching a language type corresponding to a biological feature of the person by searching a database of language types or determining a language type based on voice data of the person.

2. The method according to claim 1, wherein in response to recognizing that the person approaches the vehicle, switching the vehicle external audio system from the standby state to the working state includes:

in response to recognizing that the person approaches the vehicle, determining whether the person is a predetermined person; and in response to determining that the person is not the predetermined person, switching the vehicle external audio system from the standby state to the working state.

3. The method according to claim 1, wherein recognizing that the person approaches the vehicle includes:

recognizing that the person approaches the vehicle in at least one of a vehicle external voice waking manner, a vehicle external biological sensing manner, a vehicle body vibration sensing manner, or a vehicle external image recognition manner.

4. The method according to claim 1, further comprising, after the vehicle external audio system switching from the standby state to the working state:

obtaining orientation information of the person relative to the vehicle; and determining a position where the person is interested in the vehicle according to the orientation information, wherein controlling the vehicle external audio system to perform the voice interaction with the person based on a predetermined marketing strategy includes:

obtaining introduction information corresponding to the position where the person is interested in the vehicle based on the marketing strategy; and controlling the vehicle external audio system to issue a sales voice based on the introduction information.

5. The method according to claim 4, wherein obtaining the orientation information of the person relative to the vehicle includes:

obtaining the orientation information of the person relative to the vehicle in a voice field tracking manner, a biological sensor positioning tracking manner, or an image tracking manner.

6. The method according to claim 1, further comprising, after the vehicle external audio system switching from the standby state to the working state:

obtaining posture information of the person; and determining a position where the person is interested in the vehicle according to the posture information, wherein controlling the vehicle external audio system to perform the voice interaction with the person based on a predetermined marketing strategy includes:

obtaining introduction information corresponding to the position where the person is interested in the vehicle based on the marketing strategy; and controlling the vehicle external audio system to issue a sales voice based on the introduction information.

7. The method according to claim 1, further comprising:

in response to triggering a self-sale mode of the vehicle, obtaining at least one of light intensity or temperature of an environment where the vehicle is located and adjusting a language mode of the vehicle external audio system based on the at least one of the light intensity or the temperature of the environment where the vehicle is located.

8. The method according to claim 1, wherein according to different application scenes of the vehicle, a voice sale strategy includes a self-sale strategy for the vehicle, an item sale strategy for selling an item, a sharing service strategy for sharing the vehicle, and a delivery service strategy for item delivery.

9. The method according to claim 1, wherein an image or video information of a sale item is projected onto a road surface or wall through an external camera or a projector of the vehicle, or information about the sale item is presented to the person outside the vehicle through a screen arranged at the vehicle.

* * * * *